US012249200B2

(12) United States Patent
Browne et al.

(10) Patent No.: US 12,249,200 B2
(45) Date of Patent: Mar. 11, 2025

(54) ELECTRONIC LOCK SYSTEM AND ASSOCIATED METHOD OF OPERATION

(71) Applicant: DORMAKABA CANADA INC., Montréal (CA)

(72) Inventors: Samuel Browne, Montreal (CA); Jean-Marc Simohand, Néoules (FR)

(73) Assignee: DORMAKABA CANADA INC., Montreal (CA)

( * ) Notice: Subject to any disclaimer, the term of this patent is extended or adjusted under 35 U.S.C. 154(b) by 157 days.

(21) Appl. No.: 18/169,479

(22) Filed: Feb. 15, 2023

(65) Prior Publication Data

US 2024/0273959 A1 Aug. 15, 2024

(51) Int. Cl.
*G07C 9/00* (2020.01)
*G07C 9/27* (2020.01)

(52) U.S. Cl.
CPC ..... *G07C 9/00857* (2013.01); *G07C 9/00309* (2013.01); *G07C 9/00571* (2013.01); *G07C 9/00658* (2013.01); *G07C 9/27* (2020.01)

(58) Field of Classification Search
CPC ............ G07C 9/00857; G07C 9/00309; G07C 9/00571; G07C 9/00658; G07C 9/27
See application file for complete search history.

(56) References Cited

U.S. PATENT DOCUMENTS 10,402,587 B2 * 9/2019 Sun ..................... G06F 21/6227
2011/0103579 A1 * 5/2011 Martin .................. G06F 21/602
714/E11.032

(Continued)

FOREIGN PATENT DOCUMENTS

CN 111275860 6/2020
CN 111275860 A * 6/2020 ......... G07C 9/00309

(Continued)

OTHER PUBLICATIONS

Programming Wayne Dalton Remotes and Keypads. Veteran Garage Door Repair Dallas—Fort Worth. No Drive Up Free. Retreived from https://veterangaragedoor.com/diy/programming-wayne-dalton-remote-keypad/.

(Continued)

*Primary Examiner* — Adnan Aziz
*Assistant Examiner* — James E Munion
(74) *Attorney, Agent, or Firm* — Alexandre Daoust; Norton Rose Fulbright Canada LLP

(57) ABSTRACT

A computer-implemented solution is provided to allow electronic locks to implement commands more complex than simply opening or closing, such as timeframe-dependent commands, without requiring an access to the Internet at the time of access. At a remote computer, such as a cloud server, computer-readable instructions initially provided in a sequence of plain text characters, are encrypted into a user code using format preserving encryption (FPE) (e.g. FF3-1). The user code is communicated to the user. The user can then input the user code into the electronic lock via a numerical keypad or other suitable means. The lock is provided with computer functionalities which include a functionality to decrypt the cipher text of the user code back into plain text programming instructions using a decryption key, and execute it. The execution can involve determining whether one or more authorization condition is/are satisfied.

33 Claims, 12 Drawing Sheets

(56) References Cited

U.S. PATENT DOCUMENTS

| | | | |
|---|---|---|---|
| 2011/0307383 | A1 | 12/2011 | Ratica |
| 2022/0366742 | A1 | 11/2022 | Kushnir |

FOREIGN PATENT DOCUMENTS

| | | | | | |
|---|---|---|---|---|---|
| EP | 3352142 | A1 | * | 7/2018 | ............. G06F 21/31 |
| GB | 2443212 | | | 4/2008 | |
| GB | 2443212 | A | * | 4/2008 | ........... A47G 29/141 |
| WO | 2021207017 | | | 10/2021 | |

OTHER PUBLICATIONS

Single-Light Garage Door Operator w/ DC Motor, MegaCode & Optional Battery Backup—800N. https://southeastdoor.com/openers/linear-pro-access/ldco801/.

* cited by examiner 136 132 130 134

| User ID or lock ID | Authorized access period(s) | Programming instructions (plain text) | User code (cypher text) |
|---|---|---|---|
| 1 | 3 | 261003 | 383234 |
| 2 | 4-7 | 261047 | 425513 |
| 3 | 9 | 261009 | 845472 |
| n | x | XXXXXX | XXXXXXX |

ELECTRONIC LOCK SYSTEM AND ASSOCIATED METHOD OF OPERATION

BACKGROUND

Electronic lock systems have become increasingly popular over recent decades and are implemented in a manner to control the access to various types of physical space assets such as an office or an office building, a residential dwelling, a garage, an industrial working area, a safe, etc. The basic functionality of an electronic lock system can be associated to the basic functionality of a hardware lock system, e.g. to controlling access to the physical space asset based upon the checking of a “key”, but the key of an electronic lock system is digital instead of mechanical. To this end, electronic lock systems include at least some basic computing functionalities which can be associated to a “computer” of the lock system, or “lock computer”. The lock computer is associated to an input interface such as a keypad or any other suitable means, and to an actuator which can be operated by the computer to control the access to the physical space asset. The computing capabilities of the electronic lock system may involve providing the access contingent upon entering a correct code in the keypad and to prevent the access otherwise. The type of actuator depends on the type of electronic lock system. For instance, for an electronic lock system associated to a door, the actuator may be a solenoid adapted to retract a bolt or to free a latch which otherwise prevents the door from opening, whereas for an electronic lock system associated to a garage door, the actuator may be an electric motor associated to a mechanism operable to pulling the garage door open.

The input interface allows the lock system to receive an electronic key. Perhaps the most widely used form of electronic key is a numeric code which can be inputted into the lock system using a keypad. Such electronic lock systems are typically provided with basic programming capabilities allowing to personalize the code to a given device. The most common form of keypad has 12 keys associated to corresponding keypad characters including symbols # and * in addition to numeric characters 0-9, and a common form of electronic key (user code) has 6 numeric characters, though any symbol or other character forming the keypad characters may also be used in the electronic key. The choice of the length of the user code typically results from a trade-off or balance between security and convenience, and can depend on the use case. While longer codes provide greater security, shorter codes provide greater convenience, and the ideal balance can depend on a security level requirement. For this reason, while a code length of 8 characters can be recommended over a code length of 6 characters, the code length of 6 characters remained in wider use at the time of filing this specification.

While such electronic lock systems were satisfactory to a certain extent, there always remains room for improvement. For instance, in the case of physical space assets used by different users during different periods of time, it may be deemed inconvenient or unsatisfactory for a physical person to have to come into physical proximity with the electronic lock to reprogram/change the code between instances of accesses by different users.

SUMMARY

In accordance with one embodiment, there is provided a computer-implemented solution to allow locks to implement commands more complex than simply opening or closing, such as timeframe-dependent access control commands or behavior changing commands, without requiring an access to the Internet at the time of access. This can be useful as a baseline solution for locks which are permanently offline (e.g. without online capability), or as an auxiliary solution for connected locks during periods where an internet connection is not available, and can be useful for various use cases including temporary housing. At a remote computer, such as a cloud server, computer-readable instructions initially provided in a sequence of plain text code having between 6 and 15 characters, are encrypted into a user code using an encryption key and format preserving encryption (FPE) (e.g. FF3-1). The user code, a cipher text of the plain text code, can have the same number of characters than the plain text instructions, such as between 6 and 15 characters long (preferably 6, or 8, numerical characters) to allow it to be easily memorized and inputted into a keypad by an average human person while preserving a relatively high level of security. The user code is communicated to the user (e.g. via a desktop or a handheld device where it can be displayed). The user can then input the user code into the electronic lock via a keypad (e.g. push-button or touch-screen keypad, having keys associated to numerical, alphabetical, and/or symbol characters) or other suitable means. Characters can preferably be numbers (numeric characters, e.g. 0-9 in digital notation), though characters may also be letters (alphabetic characters, e.g. a-z, A-Z) or symbols (*, #, +, −, enter, or the like). The user code may consist of letter(s) and/or number(s) and/or symbol(s). The characters can be alphanumerical characters (e.g. a string of numbers and/or letters).

The lock is provided with basic computer functionalities (firmware) which include a functionality to decrypt the cipher text of the user code back into plain text computer-readable instructions (the plain text code) using a decryption key, and execute it. The execution can involve determining whether one or more authorization condition is/are satisfied, and if so, performing a specified security-controlled task such as unlocking the lock or revoking a user code. The decryption key can be provided to the lock at the time of installation or maintenance for instance, and involve a secure authentication process.

According to a first aspect, there is provided an electronic lock. The electronic lock may comprise an actuator operable to allow or block an access to a physical space asset. The electronic lock may comprise a lock computer operable to operating the actuator. The lock computer may have at least one memory, a processor, and an input interface including a keypad. The at least one memory may have stored thereon a decryption key and instructions executable by the processor to: receive a user code having a string of between 6 and 15 characters from the input interface; decrypt the user code into a request via a format preserving decryption protocol using the decryption key, wherein the request may include or be plain text programming instructions having a string of between 6 and 15 characters; perform a security-controlled task contingent upon determining that the request is authorized.

Using a format preserving decryption protocol enables the user code to carry command for a security-controlled task which includes not only access control tasks, such as granting access, but also behavior changing tasks. Thus, the electronic lock may not only perform access control tasks but also behavior changing tasks upon receiving respective user codes including cipher text of a corresponding one or more of an access control command or an behavior changing command. The security-controlled task can include both an access control task and a behavior changing task.

The term access control task may be understood as any access related operations and/or response of the electronic lock. Examples for access control tasks are: unlocking; granting access to a physical space asset; locking; refusing access to a physical space asset. The term behavior may be understood as pertaining to the configuration of the electronic lock, preferably including parameters of how the lock works and/or responds. Thus, the term behavior changing task may be understood as any operation and/or response of the electronic lock which causes the electronic lock to change its behavior, in particular with respect to its functionality and/or configuration. Behavior may in particular include access control behavior. Therefore, changing the behavior may include changing the way an access control task is performed, e.g., how/how long/how fast an access is granted and/or unlocking is performed, preventing an other user code which would normally have led to granting access to the physical space from granting access to the physical space, toggling into or out from a regular locking/unlocking schedule, etc.

Behavior changing tasks may include a temporary behavior change and/or a permanent behavior change. A temporary behavior change may be, e.g., remaining unlocked for a defined period of time after the user code is entered. A permanent behavior change may be, e.g., if the electronic lock remains unlocked for 10 seconds after a user code is entered which is valid for granting access.

In other words: It is a particular advantage of using the format preserving decryption protocol that it is possible to use a relatively short code with a maximum of 15 characters for performing a re-programming operation with respect to the electronic lock in addition to performing a standard access control operation.

The number of characters of a user code may be between 6 and 12, preferably between 6 and 10, preferably between 8 and 10, preferably between 6 and 8. It is advantageous in terms of usability and user experience to have a low length of user code(s) when the user code needs to be memorized by a human for a given period of time, such as when entering the user code in a keypad.

It may be provided that the security-controlled task includes at least one of granting access to a physical space asset, preventing subsequent use of an other user code, and changing a behavior of the electronic lock.

It may be provided that the format preserving decryption protocol is FF3-1.

It may be provided that determining that the request is authorized includes succeeding in said decrypting of the user code and determining that the plain text programming instructions are executable.

It may be provided that the plain text programming instructions include validity data including at least one of a checksum and a parity, said determining that the request is authorized includes determining that the validity data satisfies a validity check. The validity check may be performed based on said checksum and/or parity.

It may be provided that determining that the request is authorized includes matching the lockID to an identifier of the electronic lock stored in the at least one memory.

It may be provided that determining that the request is authorized includes determining that the user code has not been previously received and/or executed.

It may be provided that the plain text programming instructions include time period of access data, wherein said determining that the request is authorized includes determining that a current time matches the time period of access data.

It may be provided that the time period of access data includes a start time, preferably of a start day, and an end time, preferably of an end day.

It may be provided that the time period of access data defines a range of hours, preferably of a given day.

It may be provided that the time period of access data includes a definition of one or more days, wherein time period of access data defining a range of hours between an arrival hour and a departure hour is provided at the at least one memory, and determining that the request is authorized includes determining that a current time matches the time period of access data, and preferably wherein the user code has 6-12 characters, preferably 6-10 characters, preferably 6-8 characters, preferably 6 characters.

It may be provided that perform the security-controlled task includes control the actuator to allow access to the physical space asset, preferably to perform unlocking.

It may be provided that controlling the actuator to allow access to the physical space asset includes allowing access to the physical space asset for a predetermined time period.

It may be provided that controlling the actuator to allow access to the physical space asset includes automatically allowing access to the physical space asset and denying access to the physical space asset in accordance with a regular schedule, the regular schedule being stored in the at least one memory.

It may be provided that perform the security-controlled task includes deny subsequent access to an other user code. This may be part of a behavior change task. By this functionality, a blacklist may be created in which specific user codes may be entered using behavior change task(s). In other words: One valid user code may used to successfully gain access and at the same time to program a blacklist into the electronic lock which contains one or more other user codes to which no access is granted by the electronic lock.

It may be provided that a character of the plain text programming instructions is a mode number defining a mode amongst a plurality of modes, and determining whether the request is authorized includes determining the mode based on the mode number, and preferably interpreting other digits of the plain text programming instructions is performed in accordance with the determined mode.

It may be provided that the lock computer further comprises a wireless transmission module forming part of the input interface and adapted to receive the user code as an alternative to the keypad. For example, the wireless transmission module may be an optical reader device capable of reading QR-codes and/or barcodes. This is particularly advantageous if the user code is provided as a QR-code and/or barcode.

Alternatively or additionally, the wireless transmission module may be used for authenticating a second factor, apart from the user code which the user may input manually into the keypad. Therefore, providing a wireless transmission module in addition to the keypad facilitates 2-factor-authentication which enhances the security level of the present invention. In particular in high-security use cases, such as airports of governmental facilities, such 2-factor-authentication is highly beneficial.

It may be provided that when executing the instructions, and prior to said decrypting the user code, the processor attempts to decrypt a master code using a master code format for the decryption key, and proceeds to said decrypt the user code, using a non-master code format for the decryption key, contingent upon failing to decrypt a master code, and performing a security-controlled task upon succeeding in decrypting the master code.

It may be provided that the master code decryption key can be computed by any lock of the same network, which can be the case, for example, when the encryption relies on dynamic data. For instance, the master code format for the decryption key can be DKF(root_key, year, day).

It may be provided that the non-master code format for the decryption key can be computed only by the targeted lock (individual or a common access lock). The non-master code decryption key can include lock specific data such as a lock ID. Thus the cipher text can be tied to the lockID. For instance, the non-master code format for the decryption key can be is DKF(root_key, year, lockID).

When the electronic lock is enabled to address both master code user codes and non-master code user codes, the decryption process can include attempting to decrypt a master code first, and then attempt to decrypt a non-master code if the attempt to decrypt the master code fails.

It may be provided that the user code has 6 or 8 characters, such as 6 or 8 numeric characters.

According to a second aspect, there is provided a computer-implemented process of providing a operating an electronic lock, the process comprising: at the electronic lock, receiving a user code having a string of between 6 and 15 characters from an input interface; at the electronic lock, decrypting the user code into a request via a format preserving decryption protocol using a decryption key stored in a memory of the electronic lock, the request being plain text programming instructions having a string of between 6 and 15 characters; and at the electronic lock, performing a security-controlled task contingent upon determining that the request is authorized.

All technical implementations, embodiments, features and advantages described with respect to the first aspect of the present invention is mutatis mutandis applicable to the second aspect of the present invention.

It may be provided that the security-controlled task includes at least one of granting access to a physical space asset, preventing subsequent use of an other user code, and changing a behavior of the electronic lock.

It may be provided that the format preserving decryption protocol is FF3-1.

It may be provided that determining that the request is authorized includes succeeding in said decrypting of the user code and determining that the plain text programming instructions are executable.

It may be provided that the plain text programming instructions include validity data including at least one of a checksum and a parity, said determining that the request is authorized includes determining that the validity data satisfies a validity check.

It may be provided that determining that the request is authorized includes matching the lockID to an identifier of the electronic lock stored in the at least one memory.

It may be provided that determining that the request is authorized includes determining that the user code has not been previously received and/or executed.

It may be provided that the plain text programming instructions include time period of access data, said determining that the request is authorized includes determining that a current time matches the time period of access data.

According to a third aspect, there is provided a computer-implemented process of providing a user code to a user, the user code usable by the user perform a security-controlled task at an electronic lock, the process comprising: defining a request to perform the security-controlled task, the security-controlled task including at least one of granting access to a physical space asset, preventing subsequent use of an other user code, and changing a behavior of the electronic lock; generating plain text programming instructions incorporating the request, the plain text programming instructions having a format of a string of 6 to 15 characters; encrypting the plain text programming instructions into a user code using a format preserving encryption protocol and an encryption key, the user code having a format of a string of 6 to 15 characters; and outputting the user code.

All technical implementations, embodiments, features and advantages described with respect to the first aspect of the present invention is mutatis mutandis applicable to the third aspect of the present invention.

It may be provided that providing said at least one authorization condition, said at least one authorization condition including at least one of an instruction to grant access to a physical space asset during defined a time period of authorized access, an instruction prevent subsequent use of an other user code, and an instruction to change a behavior of the electronic lock.

It may be provided that defining a request includes associating the request to a lock ID.

It may be provided that the security-controlled task including granting access to a physical space asset within a defined time period of authorized access.

It may be provided that said outputting the user code includes outputting the user code over a telecommunications network to an electronic device of the user, and displaying the user code on a display screen of the electronic device.

In accordance with a fourth aspect, there is provided an electronic lock system comprising: a remote computer having an input interface, a processor, a memory having a plurality of lockIDs associated to respective ones of a plurality of electronic locks, an encryption key, and instructions executable by the processor of the remote computer to define a request to perform a security-controlled task at a corresponding one of the lockIDs for each one of the plurality of users, the security-controlled task including at least one of granting access to a physical space asset, preventing subsequent use of an other user code, and changing a behavior of the electronic lock; generate plain text programming instructions incorporating the request and the corresponding lockID, the plain text programming instructions having a format of a string of 6 to 15 characters, encrypt, via format preserving encryption, the plain text programming instructions into a user code using the encryption key, the user code having a format of a string of 6 to 15 characters, and output the user code for communication to the corresponding user; and a plurality of electronic lock devices each having a respective actuator operable to allow or block an access to a physical space asset, a lock computer operable to operating the actuator and having an input interface including a keypad, a processor, at least one memory having a respective one of the lockIDs, a decryption key corresponding to the encryption key, and instructions executable by the processor of the lock computer to receive the user code from the input interface, decrypt, using format preserving decryption, the user code into the plain text programming instructions, determine whether the plain text programming instructions are authorized, and perform a security-controlled task contingent upon determining that the plain text programming instructions are authorized.

All technical implementations, embodiments, features and advantages described with respect to the first aspect of the present invention is mutatis mutandis applicable to the fourth aspect of the present invention.

It may be provided that outputting the user code for communication to a corresponding user includes outputting the user code over a telecommunications network to an electronic device of the user, and displaying the user code on a display screen of the electronic device.

In accordance with a fifth aspect, there is provided an electronic lock comprising an actuator operable to allow or block an access to a physical space asset; and a lock computer operable to operating the actuator, the lock computer having a non-transitory memory, a processor, and an input interface including a keypad, the non-transitory memory having stored thereon a decryption key and instructions executable by the processor to: receive a user code having a string of between 6 and 15 characters from the input interface; decrypt the user code into a request via a format preserving decryption protocol using the decryption key, the access request being plain text programming instructions having a string of between 6 and 15 characters, the access request specifying at least one authorization condition; determine whether the at least one authorization condition is satisfied; and perform a security-controlled task contingent upon determining that the at least one authorization condition is satisfied.

In accordance with a sixth aspect, there is provided a computer-implemented method of controlling access to a physical space asset via an electronic lock, the method comprising, at the electronic lock: receiving a user code having a string of between 6 and 15 characters; decrypting the user code into a request via a format preserving decryption protocol using the decryption key, the access request being plain text programming instructions having a string of between 6 and 15 characters, the access request specifying at least one authorization condition; determining whether the at least one authorization condition is satisfied; and performing a security-controlled task contingent upon determining that the at least one authorization condition is satisfied.

In accordance with a seventh aspect, there is provided a computer-implemented process of providing a user code associated to at least one authorization condition to a user, the user code usable by the user to access a physical space asset via an electronic lock, the process comprising: providing a lockID associated to the electronic lock; providing said at least one authorization condition, said at least one authorization condition including a time period of authorized access; generating plain text programming instructions forming a request to access the lockID in accordance with said at least one authorization condition; encrypting the plain text programming instructions into a user code using a format preserving encryption protocol and an encryption key, the plain text programming instructions and the user code both having a string format of 6 to 15 characters; and outputting the user code.

In accordance with an eighth aspect, there is provided an electronic lock system comprising: a plurality of electronic lock devices each having a respective actuator operable to allow or block an access to a physical space asset, a lock computer operable to operating the actuator and having an input interface including a keypad, a processor, a non-transitory memory having a lock ID, a decryption key and a instruction executable by the processor to decrypt, using format preserving decryption, a user code received from the input interface into plain text programming instructions specifying authorization conditions, determining whether the authorization conditions are satisfied, and performing a security-controlled task contingent upon the authorization conditions being satisfied; and a remote computer having a processor, a non-transitory memory having the lockIDs, a encryption key corresponding to the decryption key, and instructions executable by the processor to generate plain text programming instructions incorporating authorization conditions in association with a lockID, encrypting, via format preserving encryption, the plain text programming instructions into the user code using the encryption key, and output the user code.

In accordance with a ninth aspect, there is provided an electronic lock comprising: an actuator operable to allow or block an access to a physical space asset; an input interface; and a lock computer operable to receive an input from the input interface and to operate the actuator, the lock computer having at least one memory and a processor, the at least one memory having stored thereon a decryption key and instructions executable by the processor to receive a user code having a string of between 6 and 15 characters from the input interface; decrypt the user code into a plain text code via a format preserving decryption protocol using the decryption key, the plain text code including at least one command to perform at least one security-controlled task; execute the at least one command, including performing the at least one security-controlled task.

All technical implementations, embodiments, features and advantages described with respect to the first aspect of the present invention is mutatis mutandis applicable to the ninth aspect of the present invention.

It may be provided that the input interface includes a keypad having a plurality of keys associated to corresponding ones of said characters, said receive a user code includes receive a user code from the keypad.

It may be provided that at least one of the at least one command(s) includes an access control command, said performing the at least one security-controlled task including operating the actuator to grant access to the physical space asset.

It may be provided that at least one of the at least one command(s) includes a behavior changing command and the at least one security controlled task includes at least one of preventing subsequent use of an other user code, and toggling into or out from a locking/unlocking schedule.

It may be provided that the at least one command includes both at least one access control command and at least one behavior changing command.

It may be provided that the format preserving decryption protocol is FF3-1.

It may be provided that said perform the at least one security-controlled task is contingent upon determining that the plain text code is executable.

It may be provided that the plain text code includes validity data including at least one of a checksum, Luhn, and a parity, further comprising performing a validity check against the validity data, wherein said perform the at least one security-controlled task is contingent upon determining that the validity data satisfies the validity check.

It may be provided that said perform the at least one security-controlled task is contingent upon determining that the user code has not been previously received and/or decrypted and/or executed.

It may be provided that wherein the at least one command includes time period of access data, wherein said perform the at least one security-controlled task is contingent upon determining that a current time matches the time period of access data.

It may be provided that the time period of access data includes a start time, preferably of a start day, and an end time, preferably of an end day.

It may be provided that the time period of access data defines a range of hours, preferably of a given day.

It may be provided that the time period of access data includes a definition of one or more days, wherein time period of access data defining a range of hours between an arrival hour and a departure hour is provided at the at least one memory, and said perform the at least one security-controlled task is contingent upon determining that a current time matches the time period of access data, and preferably wherein the user code has 6 numeric characters.

It may be provided that said controlling the actuator includes allowing access to the physical space asset for a predetermined time period.

It may be provided that said toggling into a locking/unlocking schedule includes controlling the actuator allow access to a physical space asset and deny access to the physical space asset in accordance with the locking/unlocking schedule, the locking/unlocking schedule being stored in the at least one memory.

It may be provided that a character of the plain text code is a mode number defining a mode amongst a plurality of modes, further comprising interpreting other characters of the plain text code in accordance with the mode associated to the mode number.

It may be provided that the lock computer further comprises a wireless transmission module forming part of the input interface and adapted to receive the user code.

It may be provided that said decrypt the user code includes attempt to decrypt a master code using a master code format for the decryption key, and attempt to decrypt a non-master code using a non-master code format for the decryption key contingent upon failing the attempt to decrypt a master code.

It may be provided that the master code format for the decryption key is derived with dynamic data.

It may be provided that the non-master code format for the decryption key is derived with lock specific data.

It may be provided that the user code has 6 or 8 characters associated to corresponding keys of the keypad, and the plain text code has 6 or 8 characters associated to corresponding keys of the keypad.

In accordance with a tenth aspect, there is provided a computer-implemented process of operating an electronic lock, the process comprising: receiving, using an input interface, a user code having a string of between 6 and 15 characters; decrypting the user code into a plain text code via a format preserving decryption protocol using a decryption key, the plain text code including at least one command for performing at least one security-controlled task; and executing the at least one command, including performing the at least one security-controlled task.

All technical implementations, embodiments, features and advantages described with respect to the first aspect of the present invention is mutatis mutandis applicable to the tenth aspect of the present invention.

It may be provided that the security-controlled task includes at least one of granting access to a physical space asset, preventing subsequent use of an other user code, and toggling into or out from a mode of operating the actuator based on a regular schedule.

It may be provided that at least one of the at least one command(s) includes an access control command, said performing the at least one security-controlled task including operating an actuator to grant access to a physical space asset.

It may be provided that at least one of the at least one command(s) includes a behavior changing command and the at least one security controlled task includes at least one of preventing subsequent use of an other user code, and toggling into or out from a locking/unlocking schedule.

It may be provided that the at least one command includes both at least one access control command and at least one behavior changing command.

It may be provided that the format preserving decryption protocol is FF3-1.

It may be provided that said performing the at least one security-controlled task is contingent upon succeeding in said decrypting the user code and determining that the plain text code is executable.

It may be provided that the plain text code includes validity data including at least one of a checksum, Luhn and a parity, said performing the at least one security-controlled task is contingent upon determining that the validity data satisfies a validity check.

It may be provided that the user code includes a lockID, and said decrypting the user code includes determining that the lockID matches an identifier of the electronic lock.

It may be provided that said performing the at least one security-controlled task is contingent upon determining that the user code has not been previously received and/or executed.

It may be provided that the at least one command includes time period of access data, wherein said performing the at least one security-controlled task is contingent upon determining that a current time matches the time period of access data.

In accordance with an eleventh aspect, there is provided an electronic lock system comprising: a remote computer having an input interface, a processor, a non-transitory memory having a plurality of lockIDs associated to respective ones of a plurality of electronic locks, an encryption key, and instructions executable by the processor of the remote computer to define at least one command to perform at least one security-controlled task at a corresponding one of the lockIDs, for each one of the plurality of users, the at least one security-controlled task including at least one of granting access to a physical space asset, preventing subsequent use of an other user code, and changing a behavior of the electronic lock; generate plain text code incorporating the at least one command, the plain text programming instructions having a format of a string of 6 to 15 characters, encrypt, via format preserving encryption, the plain text programming instructions into a user code using the encryption key, the user code having a format of a string of 6 to 15 characters, and output the user code for communication to the corresponding user; and a plurality of electronic lock devices each having a respective actuator operable to allow or block an access to a physical space asset, a lock computer operable to operate the actuator and having an input interface including a keypad, a processor, at least one memory having a respective one of the lockIDs, a decryption key corresponding to the encryption key, and instructions executable by the processor of the lock computer to receive the user code from the input interface, decrypt, using format preserving decryption, the user code into the plain text code, and perform the at least one security-controlled task based on the plain text code.

All technical implementations, embodiments, features and advantages described with respect to the first aspect of the present invention is mutatis mutandis applicable to the eleventh aspect of the present invention.

It may be provided that outputting the user code for communication to a corresponding user includes outputting the user code over a telecommunications network to an electronic device of the user, and displaying the user code on a display screen of the electronic device Many further features and combinations thereof concerning the present improvements will appear to those skilled in the art following a reading of the instant disclosure. In particular, all technical implementation details and advantages described with respect to a particular aspect of the present invention are self-evidently mutatis mutandis applicable for all other aspects of the present invention.

DESCRIPTION OF THE FIGURES

In the figures.

DETAILED DESCRIPTION

Figure 1:
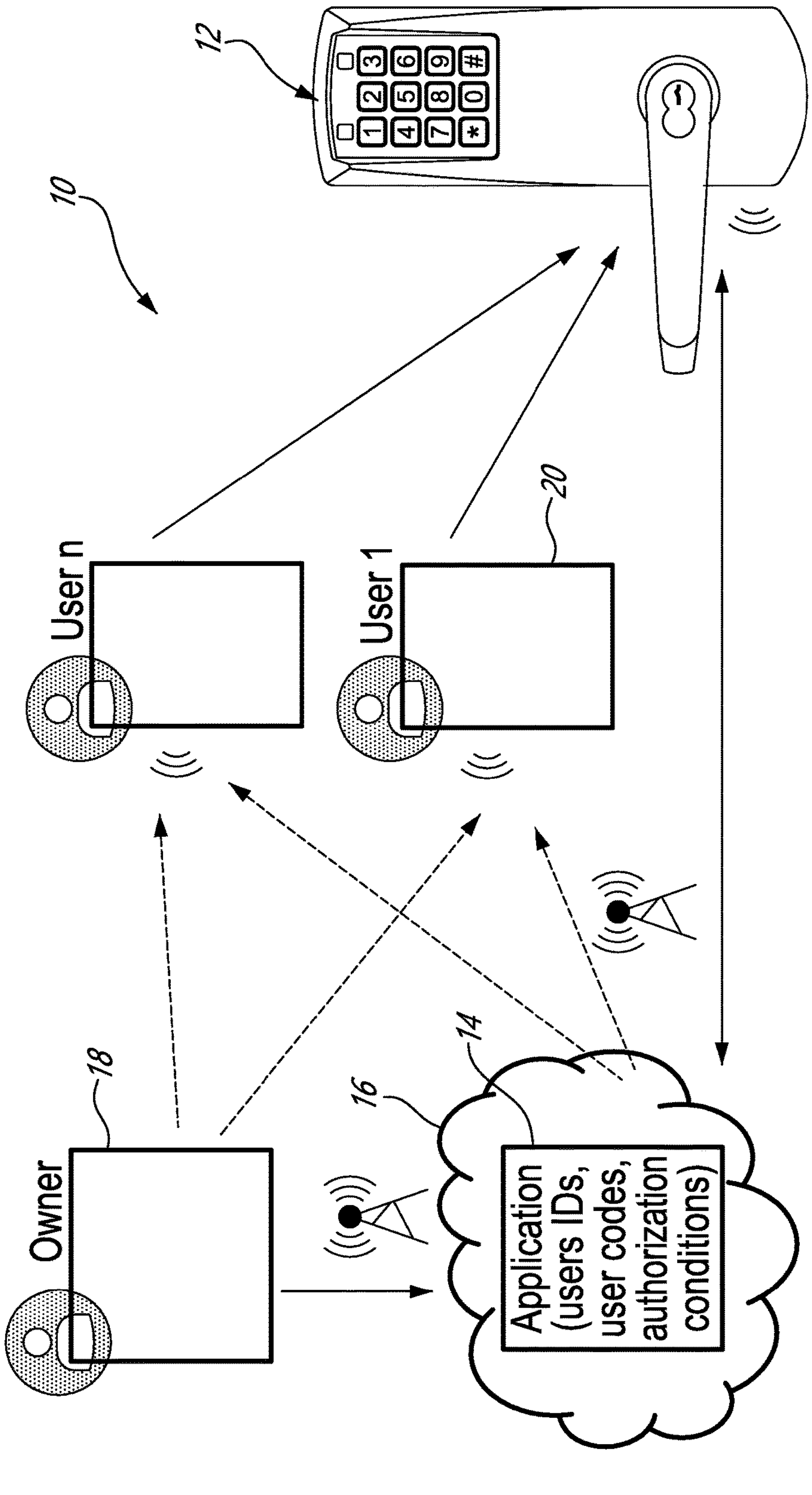
FIG. 1 is a schematic view of an electronic lock system in accordance with a first embodiment.

One approach to providing advanced functionalities to an electronic lock system is to provide the electronic lock system with means to communicate with a remote computer via a telecommunications network such as the Internet. Such electronic lock systems can be referred to as "connected" lock systems, an example of which is presented in FIG. 1.

In one example of a connected lock system 10, the control of the electronic lock 12 can be governed by an application 14 running on a computer 16 (which can be referred to as a remote computer or second computer), such as a cloud server or service provided server. The lock's internal computer (which can be referred to as the first computer or lock computer), can communicate with the application via a telecommunications network such as the Internet.

In one potential scheme of operation, an "owner" (e.g. a property owner or system administrator) wishing to provide authorization conditions specific to a first user (who may be a person other than the owner) may interface with the remote computer. This can be performed via a third computer 18, such as a smartphone, tablet, laptop, desktop or other electronic device of the owner and via a telecommunications network such as the Internet for instance, and can involve a computerized secure authentication process. Via the application, the owner may determine authorization conditions for the user 1, such as a predefined time period of authorized access for instance, or any other suitable authorization conditions (i.e. the authorization condition can be inherent in the fact that the user has access to a given code, can be that a given user will access a specific lock, and not another, and/or that a given user has access only during a defined time period of access, to name some examples). The application can then associate a user code to the user 1. The user code can be associated, in a non-transitory memory of the first computer, to the authorization condition(s). The user code can be accessible directly to the user 1 via the application (e.g. a fourth computer such as a smartphone, tablet, laptop, desktop, or other electronic device of the first user may be used to communicate with the application over the telecommunications network) or accessed by the owner and relayed to the first user by the owner for instance. Then, when user 1 enters the code into the keypad of the electronic lock 12, the electronic lock 12 communicates a request to the application via a secure connection, to determine whether the request should be granted in association to that user code and electronic lock or not. In this "connected lock system" example, this determination is made by the application itself, e.g. at the remote computer, and the authorization conditions themselves may not be communicated externally of the application (e.g. to user 1) for security reasons. If the application 14 determines that the request satisfies the authorization condition(s), the application responds in a manner to authorize the request, and the electronic lock 12 grants the access, whereas if the application 14 determines that the request does not satisfy the authorization conditions, the application 14 responds in a manner to negate the request, and the electronic lock 12 denies the access. Similarly, one or more different user code can be associated to one or more additional user (e.g. user n), and tied to the same or different authorization conditions. The application may manage many different lock systems, each of which may be attributed a respective lock identifier (lockID).

Figure 2:
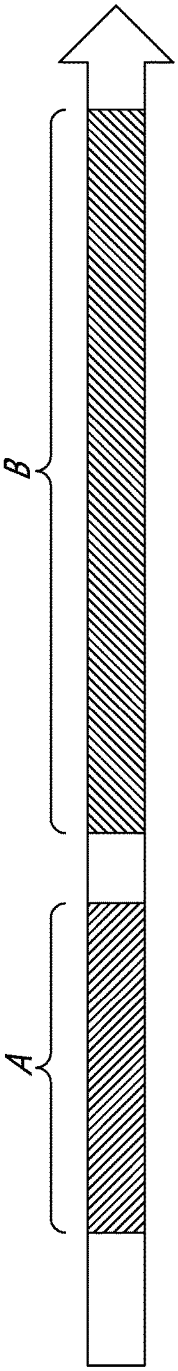
FIG. 2 is a timeline graph schematically depicting mutually exclusive access periods.

Indeed, referring to the timeline presented in FIG. 2 for instance, a first user code may be attributed to a first user, and associated to authorization conditions specifying a first period of time A of exclusive access to premises to the first user. A second user code may also be attributed to a second user, before or after attributing the first user code to the first user. The second user code may be associated to authorization conditions specifying a second period of time B, distinct from the first period of time, of exclusive access to the premises to the second user. If the first user enters the first user code into the electronic lock 12 which controls the access to the premises during the first period of time A, the application 14 accessed by the electronic lock 12 will grant the access, whereas if the first user code is used during the second period of time B, the application 14 accessed by the electronic lock 12 will deny the access, and vice-versa for the second user code.

One advantage of such a connected lock system 10 is that it can offer a significant amount of versatility in terms of supported modes as the application can be run in a cloud server having quasi-unlimited computing capabilities. Moreover, when the users are persons other than the owner, the request does not require the owner's intervention at the time of access. Indeed, the owner can "program" the authorization conditions beforehand. In some cases, the programming of the authorization conditions can be automated to a certain degree and may even be controlled, via suitable software, without requiring intervention of the owner, but directly by the application 14 for instance (or another virtual instance which interfaces with the application 14). One disadvantage of such a system is that the electronic lock 12 requires Internet connectivity to determine whether the authorization conditions are met, and access may thus be incorrectly negated in the event of any form of malfunction associated to the connectivity to the application 14. Such disadvantages may be deemed unsatisfactory in some embodiments. Another potential disadvantage of such a connected lock system 10 is the possibility of piracy associated to the Internet connection ability.

It was found that in at least some embodiments, such disadvantages could be addressed or alleviated at least to a certain extent via a different scheme of operation. An example of such a scheme of operation is presented in FIG. 3.

Figures 3, 4:
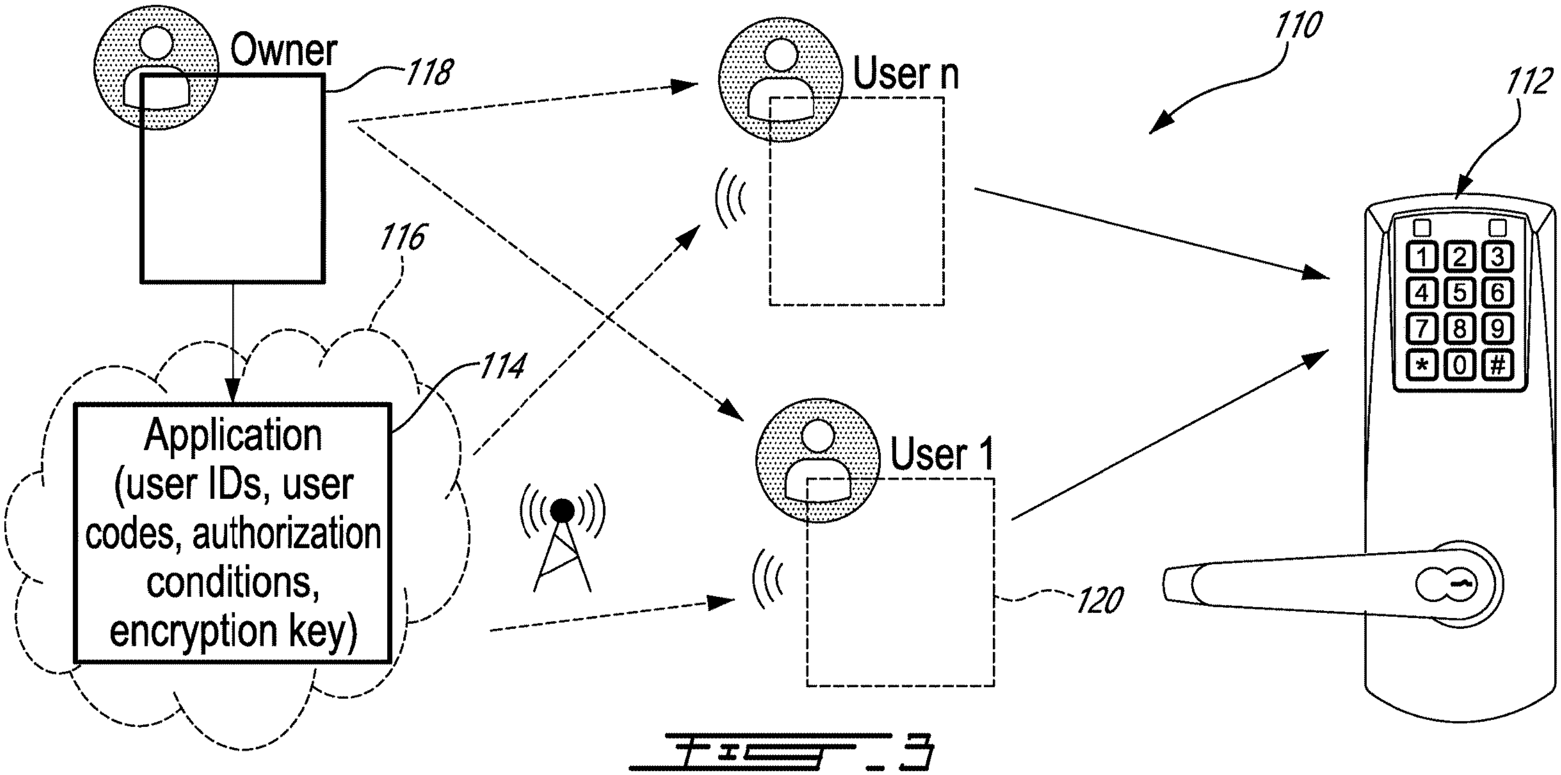
FIG. 3 is a schematic view of an electronic lock system in accordance with a second embodiment.
FIG. 4 is a table exemplifying how different authorized access periods can be attributed to different users.

A main difference between the scheme of operation illustrated in FIG. 1 and the scheme of operation illustrated in FIG. 3 is that in the scheme of operation illustrated in FIG. 3, the determination of whether a given code satisfies authorization conditions can be performed at the lock computer forming part of the electronic lock 112 rather than at a remote computer 116 running an application 114. This can allow more resilience against eventual connectivity issues, such as failures of the telecommunications network, for instance. Such a mode of operation may appear counter-intuitive to persons having ordinary skill in the art, as one may ask, for instance, how to program authorization conditions into a lock computer of the electronic lock 112 taking into consideration the relatively limited input interface or computing capabilities that such a lock computer may have (e.g. a 12 digit keypad and firmware), and all applicable security and convenience requirements. It was found possible to achieve this in a satisfactory manner in at least some embodiments by using a technique which involves generating user codes which constitute, in fact, plain text programming instructions (plain text code). Each valid user code forms a cipher text of plain text code executable by the lock's computer.

More specifically, with reference to FIG. 4 for instance, plain text code 130 incorporating one or more command, such as an access control command including time period of access data 132 (and/or, as we will see below, one or more behavior-changing command) can be initialized in the form of a plain text code having between 6 and 31, between 6 and 15, between 6 and 12, or 6 or 8 characters (6 in the example presented in FIG. 4). The characters can be selected as a function of characters associated to keys of a keypad of the electronic lock, and may be limited to numbers, or may include one or more of symbols and letters depending on the embodiment. Using only numbers is one possible embodiment.

The details of these requests can then be hidden to the users by encrypting them. In some embodiments, the encryption technique may lead to a resulting cipher text which may be longer, and perhaps a significantly longer string of characters than between 6 and 31, or between 6 and 15 characters, leading to a user code which may be deemed inconvenient or unpractical for many applications. In some other embodiments, the length of the user code can be limited. For instance, if format preserving encryption (FPE) is used to convert the plain text code into user codes (cipher text), the resulting user codes will have the same length (number of characters) as the associated plain text rcode, yet will remain undecipherable by the user as long as the user does not have access to the decryption key. A remaining challenge then is to produce plain text programming instructions in a format which accommodates a limited volume of data (number of bytes), and which can be represented by a relatively short string of characters, such as between 6 and 15 numeric characters, preferably 6 or 8. It was found possible to overcome this remaining challenge in a manner which involves selecting a suitable format and providing adapted firmware at the lock's computer. Indeed, in some cases, the firmware can expect the selected format, reducing the amount of information which needs to be shared by the payload, and some default values may be stored at the lock's computer for instance. Moreover, a character of the plain text code can be reserved for a mode number, and used, at the lock computer, to determine in accordance with which mode the command should be interpreted.

One example of an authorization condition is that the decryption succeeds in producing plain text programming instructions (plain text code) which are executable at the lock (i.e. where an attempt to execute the plain text does not lead to errors). Indeed, invalid codes may either not be decipherable or lead to plain text programming instructions which produce errors. However, as it will be understood from the further examples below, it can be preferred to provide additional authorization conditions, and such authorization conditions may depend on the nature of the security-controlled task requested. For instance, one authorization condition would be that the user code be only executable at a specific lock and not others. Another authorization condition could be that the user code be only executable during a given, defined, time period of authorized access. Another authorization can be that the cipher text includes a lock ID which matches the lock ID of the lock where the code is entered. Another additional authorization condition could be a successful validity check such as a checksum check, Luhn check or parity check. Indeed, a checksum, Luhn or parity can be included in the plain text code together with one or more command. More detail will be provided below.

Referring back to FIG. 3, one way to avoid sharing the decryption key (associated to the encryption key) with the user is by providing the decryption key directly to the lock computer of the electronic lock 112 (e.g. at the time of installation or during maintenance). Accordingly, the electronic lock 112 can be enabled to decrypt the user code (i.e. the cipher text) into the plain text code, and then execute this plain text code, including determining whether any implicit or explicit authorization conditions are fulfilled or not, and performing a security controlled task contingent upon the authorization conditions being determined to be fulfilled. Example types of format preserving encryption (FPE) include FF3-1 and FF1. It was found that in some embodiments, using a format preserving encryption allowed to reach a code length having 6 numerical digits for instance, while allowing relatively complex operation modes. The nature of the security-controlled task to be performed can depend on the embodiment, and can include one or more of controlling an actuator to provide access to a physical space asset, and/or changing the behavior of the of the lock such as preventing a code which would have otherwise been executable from access going forward, and/or toggling the lock to automatic operation in accordance with a schedule. Accordingly, the plain text code can include an access control command (e.g. operate actuator to provide access for a few seconds), a behavior change command (e.g. revoke or override a code and/or toggle into or out from automatic activation in accordance with schedule), or both.

Let us now look more deeply into details of the example embodiment of a lock system 110 presented in FIG. 3. In this example, the owner (e.g. a property owner or system administrator) wishing to grant access to an electronic lock 112 to a first user (e.g. user 1) interfaces with an application 114 which runs on a computer 116 which is remote to the electronic lock 112. This "remote computer" 116 can be a server such as a cloud server or a server located at premises owned by an owner of the premises or owned by a service provider. The remote computer 116 is not the lock computer at the physical locality of the electronic lock 112. This can be performed via a third computer 118, such as a smartphone, tablet, laptop, desktop or other electronic device of the owner and via a telecommunications network such as the Internet for instance, and can involve a computerized secure authentication process. Alternately, the application 114 can run on an electronic device of the owner and be accessed directly by the owner. Via the application 114, which can provide a user-friendly interface to the owner, the owner may associate different authorization conditions 132 for different users.

Figure 5:
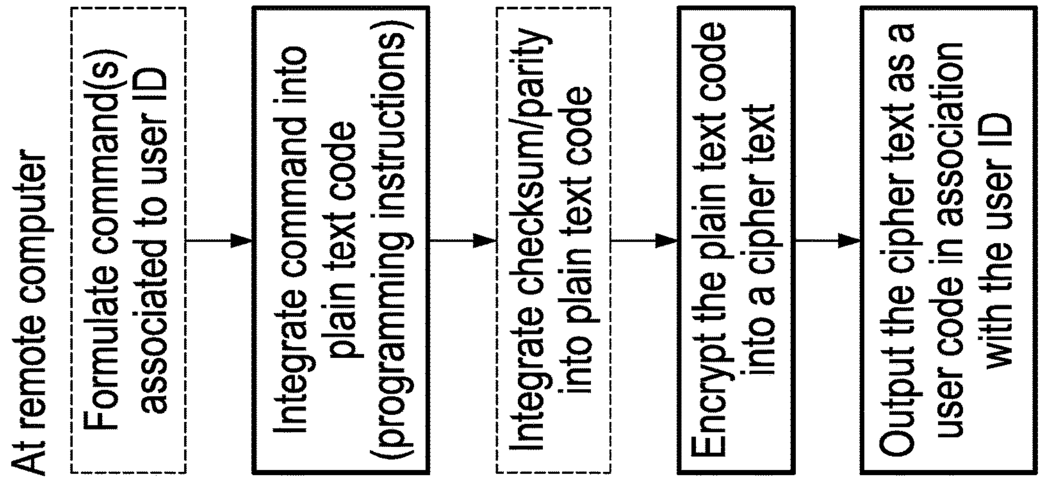
FIG. 5 is a flow chart of a computer-implemented process of providing a user code associated to at least one authorization condition to a user which can be executed at a remote computer.

The relatively simple example presented at FIG. 4 involves setting different access periods (e.g. days, hours, or other time increments) to different users (represented in the computerized environment as userIDs and/or lockIDs 136). As presented in FIG. 5, the application 114 running on the remote computer 116, having received one or more command, and any specific authorization conditions 132 in association with a userID or lock ID, can incorporate the command(s) into plain text code 130. Validity data such as a Luhn or parity can also be incorporated into the plain text code 130. A mode number can also be integrated into the plain text code 130. The application 114 can further encrypt the plain text code 130 to produce the corresponding user code 134. In some embodiments, this user code 134 may be made available by the application to the owner him/herself, who may be responsible for communicating the different user codes 134 to the different users by any suitable means (in-person, telephone, email, text message, etc). In some other embodiments, these user codes 134 may be made available by the application directly to the different users. For instance, the owner may have entered user coordinates, such as email or sms phone numbers, directly into the application 114, which may communicate the user codes 134 directly to the users, automatically. In an alternate embodiment, different users may be provided with a means of establishing a secure authentication process with the application 114 so as to access the codes directly, which may be more convenient to the owner.

Figure 6:
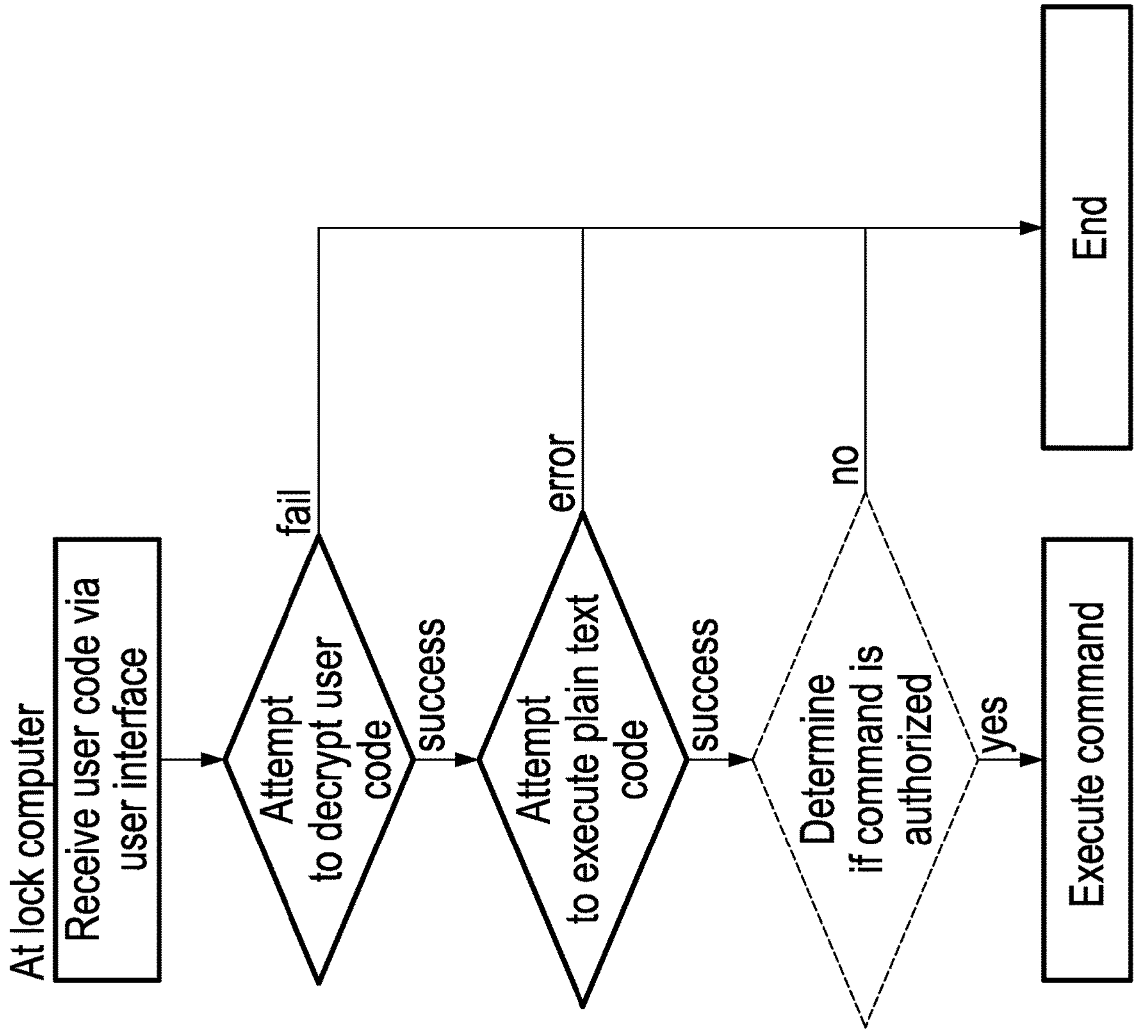
FIG. 6 is a flow chart of a computer-implemented method of controlling access to a physical space asset via an electronic lock which can be executed at a lock computer.

The different users, each provided a user code, with or without knowledge that this code is in fact cipher text of plain text code including one or more command and readable by the lock computer, but without any means to access the decryption key, may then enter the user code into the interface which communicates with the lock computer (e.g. enter it via the keypad) at the premises/electronic lock 112. As presented in FIG. 6, the lock computer may then proceed to attempt to decrypt the user code, and if the decryption is successful, attempt to execute the plain text code, and if the execution is successful (e.g. does not lead to error) determine whether any explicitly embedded authorization conditions are met or not without requiring any access to a remote server or external application 114.

Executing the command may have different results depending on the embodiment and the exact instance of which particular user code is being addressed. If the command is an access control command, it may lead to controlling an actuator to provide access to the physical space asset protected by the electronic lock. If the command is a behavior changing command, it may lead to executing one or more other types security-controlled tasks such as changing the behavior of the electronic lock going forward (e.g. revoking or overriding a user code which would otherwise have provided an acceptable request, or changing the schedule in accordance to which a common access lock is switched between open and closed). Example modes of operation will be presented below.

Referring back to FIG. 3, similarly, one or more different user code can be associated to one or more additional user (user ID), and tied to different time period of access data. The application 114 can manage many different electronic locks 112, each of which may be attributed a corresponding lockID. Such a scheme of operation may be applied to an electronic lock 112 which does not have a telecommunication network connectivity function, or to an electronic lock 112 which has a telecommunication network connectivity function (e.g. as a fallback in the event of a telecommunication network failure or other failures in the primary mode of operation). Indeed, an advantage of such a scheme of operation is that it may offer a significant amount of versatility, may not require the owner's intervention at the time of access, and may be more resilient to communication failures and/or to piracy.

It will be noted that depending on the embodiment the input interface of the electronic lock may have additional elements than a keypad e.g. (BLE, Wifi, AP, NFC, USB, . . . ), but in many embodiments, a keypad will be provided as part of the electronic lock system (either within a housing of an electronic lock itself or as part of a separate housing communicating wirelessly or in a wired manner with the housing of the electronic lock itself) and can use as a primary or, in some embodiments, only as an auxiliary mode of inputting the user code (e.g. in the event of connectivity issues).

A specific example use case, and several potential modes of operation executable in the context of this specific use case, will now be presented for the purpose of providing a thorough description. It will be noted that his example use case is but one potential example, and that many alternate embodiments are possible as will be understood by persons having ordinary skill in the art at the reading of this specification.

The specific use case can be referred to as "access code on demand" and involve: a) an administrator (such as a property owner, or service provider), b) an application which can be embodied here on a cloud server and responsible for generating the user code associated to authorization conditions, c) users, with each user having his/her own electronic device (e.g. PC, laptop, mobile phone, . . . ) to receive the user code from the application, d) the electronic lock having computer functionalities, an input interface having a pin pad and potentially any other suitable input means, and an actuator controllable by the lock's computer to control access to a physical space asset.

Figure 7A:
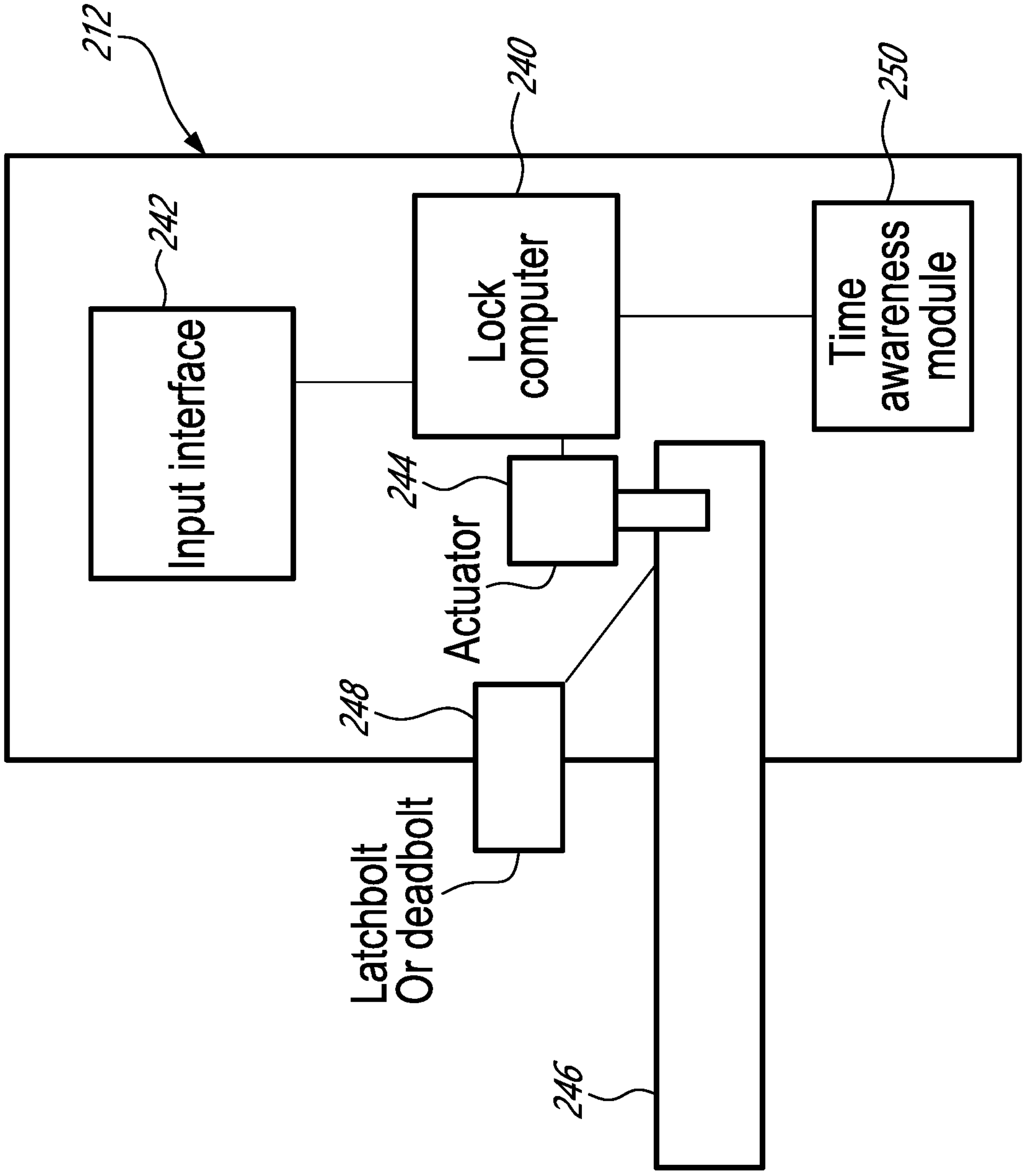
FIG. 7A is a schematic view of an example of an electronic lock.

FIG. 7A schematizes one possible embodiment of an electronic lock 212 which can be seen to have a lock computer 240 configured to receive an input from an input interface 242 and to control an actuator 244 which can selectively block or unblock a handle 246 which controls a bolt, or pull or push a deadbolt 248, or block or unblock a latch bolt, for instance, in this example. The electronic lock 212 can further have a time awareness module 250, such as an internal clock, accessible by the lock computer 240 to determine whether any time-related authorization conditions (e.g. 132, FIG. 4) are met or not. It will be understood that this is but one example of an embodiment of an electronic lock, and that many alternate configurations are possible in other embodiments. In particular, it will be understood that the different electronic elements or computerized functionalities of the electronic lock can be incorporated in a same or distributed in different housings, and be configured for communicating with one another in a wired or wireless manner. The embodiment presented in FIG. 7A is an example relatively typical for the North American market where the lock computer, input interface (e.g. a keypad), time awareness module, and actuator are all integrated to a single housing of an electronic lock, an example of which is electronic lock 112 in FIG. 3.

Figure 7B:
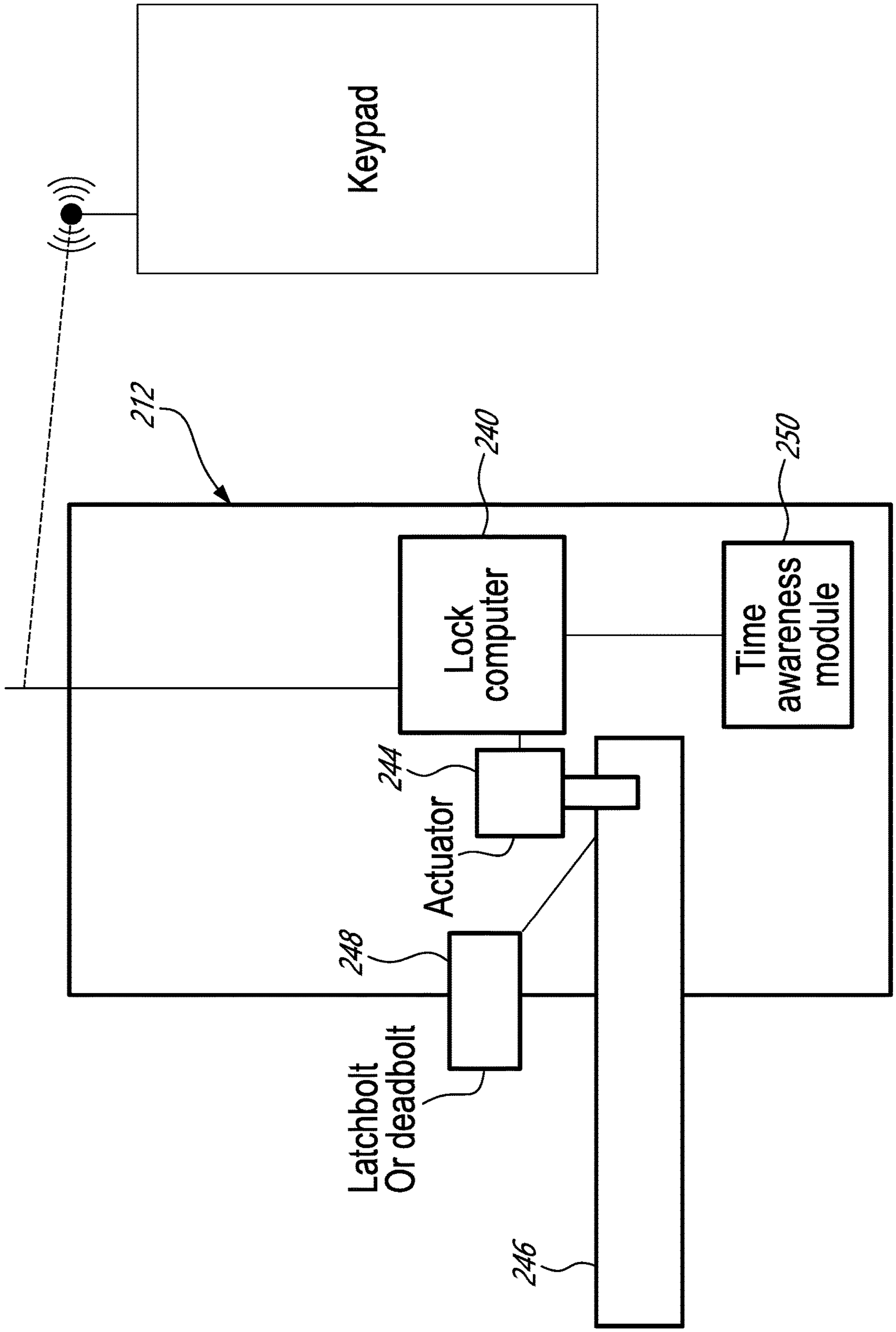
FIG. 7B is a schematic view of another example of an electronic lock.

FIG. 7B provides a different example of an electronic lock which is relatively typical for the European market where the lock computer, time awareness module and actuator are all integrated to a main housing associated to the latch or deadbolt of the electronic lock, but the keypad is manufactured and installed separately and configured to communicate with the lock computer in a wireless manner. The keypad can be adhered or fastened on a wall or on the door, in proximity to the main housing, at the premises of the electronic lock, for example.

A keypad typically has a number of keys associated to corresponding characters. The most typical use case is 10 digits and symbols, but other embodiments are possible. The characters of the user code can be constrained to the characters associated to the keys of the keypad, and to this end, it can be desired to standardize the keypad for the electronic locks associated to all lock IDs in some embodiments, or to limit the characters of the user codes to characters known to be common to keys of all keypads of all lock IDs.

Figure 8A:
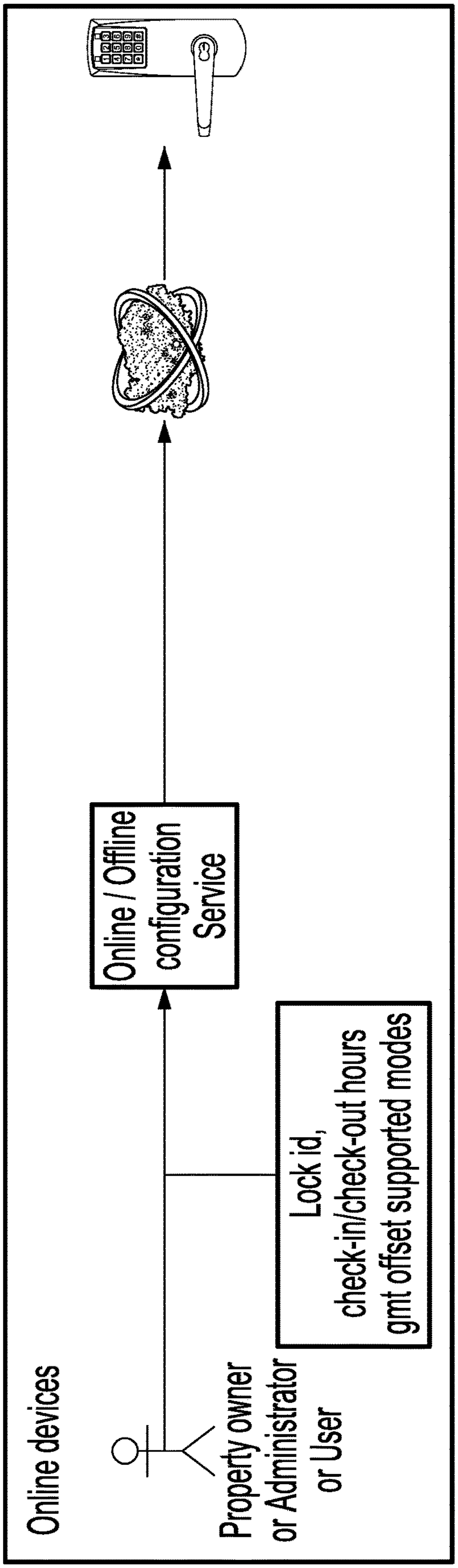
FIGS. 8A and 8B are schematic views of a configuration mode for an electronic lock in accordance with an example use case.
Figure 8B:
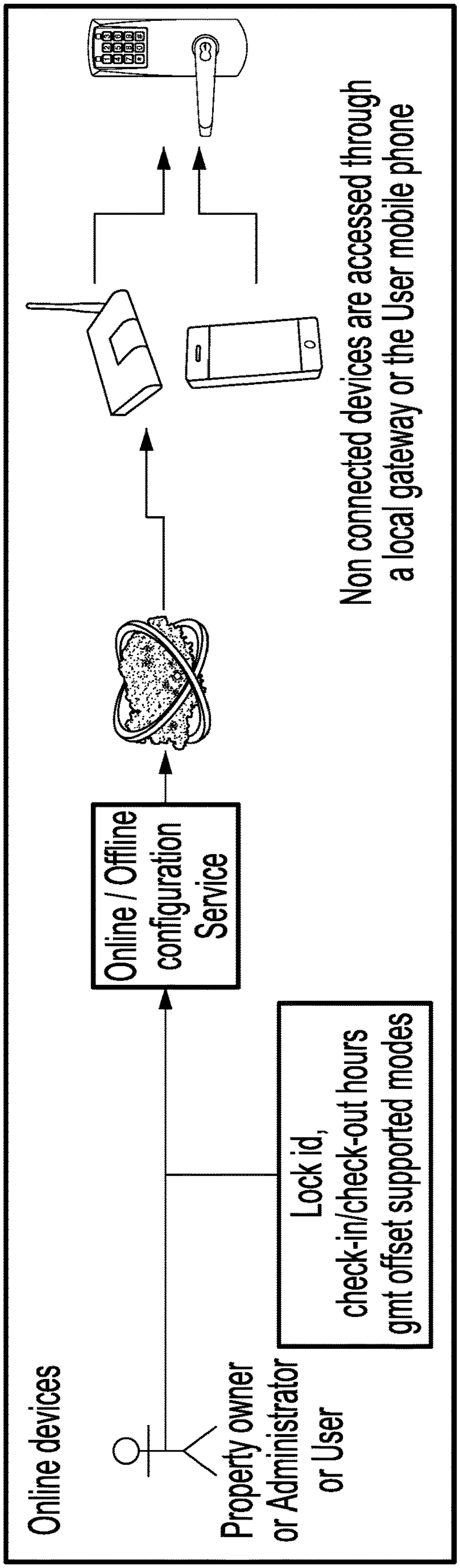

FIGS. 8A and 8B schematize an example configuration stage in accordance with this example use case, FIG. 8A represents an example configuration stage for an online device, in which the access code on demand request scheme may be useful in the event of a telecommunication failure for instance, whereas FIG. 8B represents a configuration stage for an offline device in which the access code on demand request scheme may be the primary mode of operation. The configuration stage includes providing a plurality of configuration elements to the electronic lock, such as setting the lock ID and providing the decryption key. In this specific example, the configuration stage further sets check-in/check-out hours, offset to cmt timezone, and a list of supported modes. In the online device scheme presented in FIG. 8A, the configuration may be performed entirely remotely, i.e. without manual handling at the premises. In the offline device scheme presented in FIG. 8B, the configuration may involve accessing the electronic lock through some form of local gateway while the configuration is performed.

Figure 9:
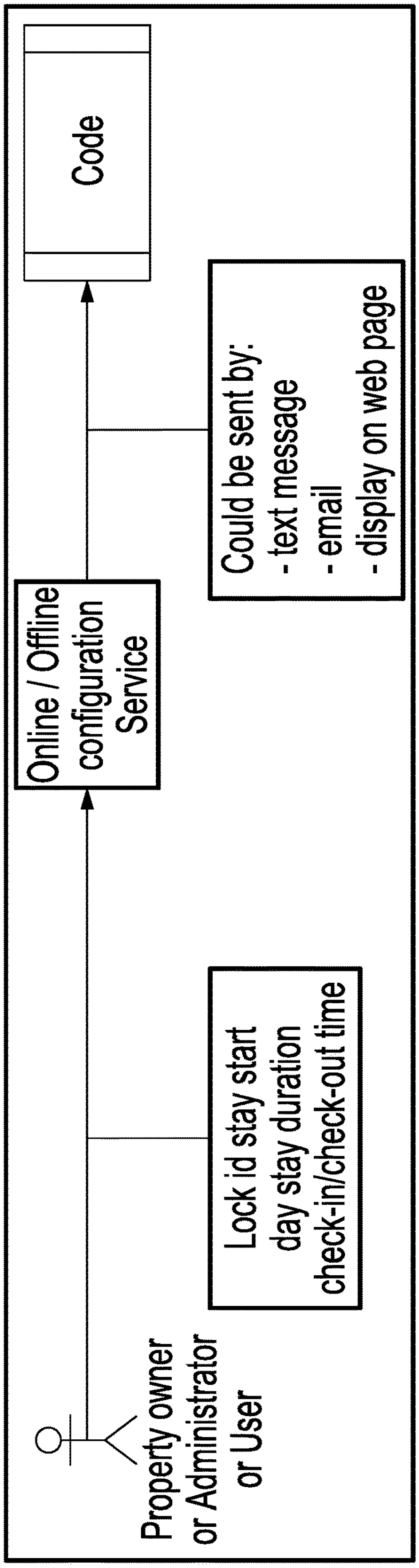
FIG. 9 is a schematic view of a code generation mode for an electronic lock in accordance with the example use case.

FIG. 9 presents an example code generation stage in accordance with this example use case. The administrator, or perhaps in some embodiments to a certain extent the user him/herself, provides authorization conditions including a lock ID and a time frame for access such as a start day and a duration. The application can then generate the user code and communicate it to the user via text message, email, display it on a web page accessed by the user, etc.

Figure 10:
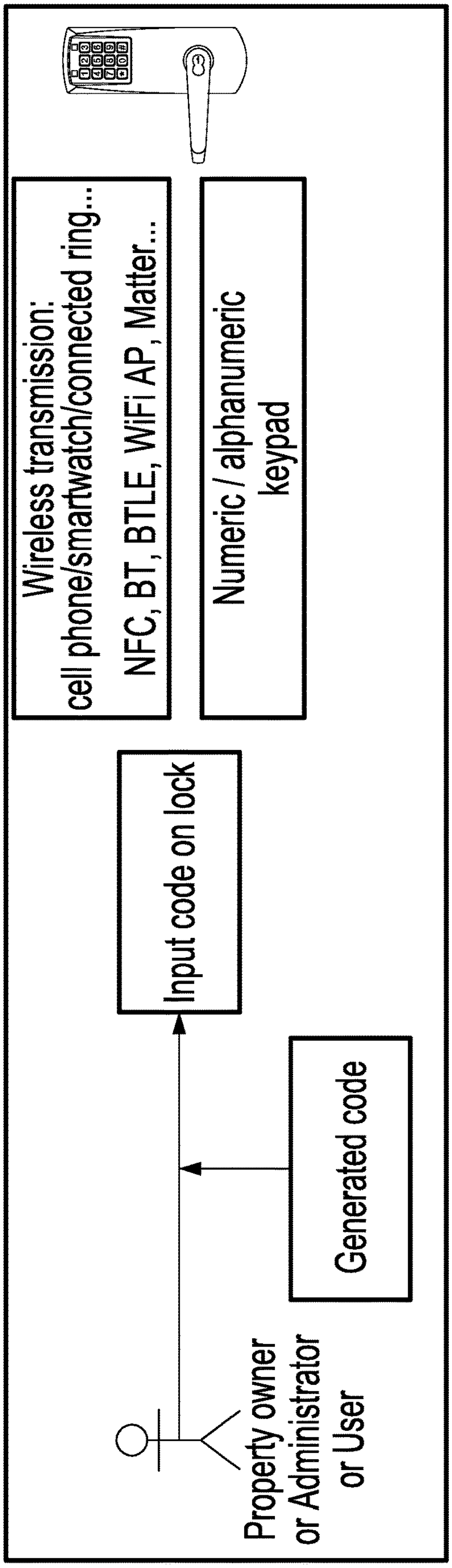
FIG. 10 is a schematic view of a user code input mode for an electronic lock in accordance with the example use case.

FIG. 10 presents an example code use stage in accordance with this example use case. A person, typically a user, enters the user code on the lock. This step can be performed via a keypad, but alternately with any other suitable means such as various wireless transmission schemes.

In this example use case, the electronic lock's firmware supports: i) FF3 encryption (for constrained devices AES encryption is mandatory, and FF3-1 can be built on top of it); ii) DKF-SHA256 key derivation function (for constrained devices SHA256 is mandatory, KDF (e.g. HDKF) can be implemented on top of it); iii) a non-transitory memory such as flash storage to store revocation and/or override lists; and enough RAM to support encryption and key derivation. A lock ID check can be done through the decryption key derivation. Moreover, each lock is identified by its lock number which is a unique numeric value; each lock can be configured as a common access or a resident door; each lock of the same residence has a same root key; each lock is date aware (e.g. using RTC), and in some cases, common access locks may have a range of allowed "resident door" IDs set to restrict the access. As will be seen below, an embodiment may use a checksum (sha-256) for the configuration, but it will be understood that it may be preferable to replace this by a signature in some embodiments.

In this embodiment, each electronic lock may support up to 8 concurrent configurations, which may allow to validate codes from 8 different applications/sites.

Locks used at premises with several other electronic locks may be provided with a common root key. Electronic locks associated to resident doors may derive the root key with lock specific data, such as the concatenation of the current year and the lock number. If master codes mode is provided, the encryption key can be derived from dynamic data. If master codes mode is provided, the encryption key can be derived from the concatenation of the year, the day in the year. In this embodiment, due to the way we derive the Lock key, a code is only valid in the January 1st to December 31st range, but other ways to derive the lock key may be used in alternate embodiments. The derivation topic can be utf-8 encoded.

In this example use case the user codes can be 6 to 12 digits (including a checksum or parity), preferably 6 to 9 digits, and FPE encrypted, and can be as per the following generic view:

| payload | Luhn or parity | OTP Mode |
|---|---|---|
| 13 to 23 bits | 0-15 or 0-1<br>4 bits or 1 bit | 0-15<br>4 bits |

The Luhn or the parity can be computed on the payload, and then the Code is obtained by encrypting using Lock key and the FF3-1 algorithm.

The first mode which will be explored in the context of this example use case is the resident code. This is a code which is valid for an entire year (365 consecutive days) and which, in accordance with this example use case, can be revoked or overridden.

| Code starting day | Override level | Luhn | OTP Mode |
|---|---|---|---|
| 1-366<br>9 bits | 0-3<br>2 bits | 0-15<br>4 bits | 0<br>4 bits |

This gives a total of 19 bits (6 digits). For instance, if this code is generated on 2022 Jul. 18, it will be encrypted with 2022 key and the validy period will be from 2022-07-18 to 2023-07-18 (last day excluded). 4 override levels (0-3) can be supported. Such a resident code can be generated using the following example code in this example use case:

```
/ **
* Resident code generation
* the ResidentCode class is not disclosed.
*/
parameter startDate   /**< the date object */
parameter overrideLevel /**< the override level (integer) */
parameter configuration /**< device configuration object */
/** instantiate a ResidentCode object */
let ACode = ResidentCode(startDate.dayOfYear( ), overrideLevel)
/** compute & append the Luhn value (1 digit) */
ACode.computeLuhn( )
key = KDF(configuration.buildingKey, startDate.year( ) + configuration.lockNumber( ))
outputCode = Acode.encrypt(key, configuration.buildingTweak)
secure_wipe(key)
del ACode
```

return outputCodeA second example mode in accordance with this example use case is the visitor code. The visitor code can be a code valid a specific day, starting at a specific time and for a selectable duration (in hours), and which can be revoked or overridden.

| Start time | Duration (in hours) = 2 * (value + 1) | Day | Override level | Luhn | OTP Mode |
|---|---|---|---|---|---|
| 0-23<br>5 bits | 0-3<br>2 bits | 1-366<br>9 bits | 0-3<br>2 bits | 0-15<br>4 bits | 1<br>4 bits |

This gives a total of 26 bits (8 digits)

A third example mode in accordance with this example use case is the short term code. The short term code is valid from specific day for a selectable duration (in days). This is a code which can be revoked but not overridden, and which can fit vacation rental usage for instance.

| Override level (optional, present if flag is set) | Override flag (optional) | Start day | Duration (in days) | Parity bit (set if even parity) | OTP Mode |
|---|---|---|---|---|---|
| 0-3<br>2 bits | 0-1<br>1 bit | 1-366<br>9 bits | 1-31<br>5 bits | 0-1<br>1 bit | 2<br>4 bits |

The parity bit is set if the payload parity is odd (payload: concatenation of start day, duration and the override level), which gives a total of 19 bits (6 digits). Optionally: to become active, the code must be entered within a defined time frame (from the stay start), otherwise the code is no longer accepted.

A fourth example mode in accordance with this example use case is the long term code. It is a code which is valid until a defined day. It can be revoked or overridden.

| end year | End on day | Override level | Luhn | OTP Mode |
|---|---|---|---|---|
| 0-1<br>1 bit | 1-366<br>9 bits | 0-1<br>1 bit | 0-15<br>4 bits | 3<br>4 bits |

Here, the end year field value is max(target end year−current year, 1), and the override level had been reduced to 1 bit to fit in 6 digits. This gives a total of 19 bits (6 digits).

A fifth example mode in accordance with this example use case is a delivery code. The code is valid only once in specific week. It can be suitable for a home delivery service. It can be revoked or overridden.

| Valid on week | week delivery identifier | Override level | Luhn | OTP Mode |
|---|---|---|---|---|
| 1-52<br>6 bits | 0-7<br>3 bits | 0-3<br>2 bits | 0-15<br>4 bits | 4<br>4 bits |

This gives a total of 19 bits (6 digits). The code counter allows to generate different codes for different deliveries on the same week.

A sixth example mode in accordance with this example use case is a revocation code. The revocation code can be used to revoke a generated code, independently of whether the code to be revoked has already been used or not.

| OTP to revoke | Luhn | OTP Mode |
|---|---|---|
| <encrypted OTP value><br>19 to 26 bits | 0-15<br>4 bits | 5<br>4 bits |

This gives a total from 27 to 34 bits (9 to 11 digits)

A seventh example mode in accordance with this example use case is a passage mode code. Such a code can be configure the device to stay in a state where anyone can access (or be denied the access). It can be revoked or overridden. In the example use case, this mode may be enabled only in electronic locks configured as “common access” locks.

| Start time (half hour steps) | Duration (half hour steps) | Passage Mode | Override | Luhn | OTP Mode |
|---|---|---|---|---|---|
| 0-47<br>6 bits | 1-48<br>6 bits | 0-1<br>1 bit | 0-3<br>2 bits | 0-15<br>4 bits | 6<br>4 bits |

This gives a total of 23 bits (7 digits).

Passage mode values:

| Value | description |
|---|---|
| 0 | (Passage mode) The Lock opens at "Start time" for "Duration" |
| 1 | (Lock out mode) The Lock closes at "Start time" for "Duration" |

Notes: 1—If the "Start Time" is set to 0 and "duration" is set to 48, the selected mode remains endlessly active; 2—To cancel the current Passage/Lock out state, a code with the same starting hour, duration and mode must be entered; 3—if the Lock is in a Passage or Lock out mode and a new code is entered, the Lock must switch to the new parameters.

An eighth example mode in accordance with this example use case is a time based master code. Such a code can allow access to all devices. The code can be time-based and valid for 10 minutes, and can be revoked or overridden. The Master code use a different key derivation topic in this example use case, the encryption key is HKDF(Root key, year| day of the year).

| (optional) code lifespan | Day of the year | Code counter | Tick in the current day | Override level | Luhn | OTP Mode |
|---|---|---|---|---|---|---|
| 0-15<br>4 bits | 1-366<br>9 bits | 0-3<br>2 bit | 0-144<br>8 bits | 0-3<br>2 bits | 0-15<br>4 bits | 7<br>4 bits |

This gives a total of 29 bits (9 digits), 10 digits if the optional code lifespan is used. The Tick value is computed as: Tick=(start.hour*60+start.minutes)/lifespan. The code counter allows to generate 4 different codes for the current 10 minutes period.

| Lifespan value | Code lifespan |
|---|---|
| 0 | 10 min |
| 1 | 15 min |
| 2 | 30 min |
| 3 | 1 h |
| 4 | 1 h 30 min |
| 5 | 2 h |
| 6 | 3 h |
| 7 | 4 h |
| 8 | 6 h |
| 9 | 8 h |
| 10 | 10 h |
| 11 | 12 h |
| 12 | 14 h |
| 13 | 16 h |
| 14 | 20 h |
| 15 | 24 h |

An ninth example mode in accordance with this example use case is a flex code mode. The code is valid from specific day for a selectable duration up to 366 days. It allows flexible check-in/check-out hours. It can be revoked but not overridden.

This code is a variable length code: The start day & duration field are encoded in 6 to 9 bits (each), the field length is declared in the duration size and start day size fields. The check-out and check-in hours are optional. If one of those is used, the Check-in/Check-out flag must be set according to the selected option.

| (optional) check-out offset | (optional) check-in offset | (optional) Check-in/ Check-out flag | stay duration | start day | start day size | duration size | Override level (if override flag is set) | Override flag | Parity (set if even parity) | OTP Mode |
|---|---|---|---|---|---|---|---|---|---|---|
| 0-15<br>4 bits | 0-15<br>4 bits | 0-1<br>1 bit | 1-366<br>6 to 9 bits | 1-366<br>6 to 9 bits | 0-3<br>2 bits | 0-3<br>2 bits | 0-3<br>2 bits | 0-1<br>1 bit | 0-1<br>1 bit | 8<br>4 bits |

The start day size and duration size fields are computed the same way (respectively to the targeted field). The duration size is computed as the minimum size to encode the stay duration field, with a minimum of 6 bits and a maximum value if 366. It can be computed as duration_size=max(ceil (log 2(stay_duration))−6, 0).

When building the frame, the Stay duration field multiplier can be

| duration size | field multiplier |
|---|---|
| 0 | 64 |
| 1 | 128 |
| 2 | 256 |
| 3 | 367 |

Multiplier can be fetched from a look up table (or dictionary) or a literal such as duration_multiplier=min(1<<(duration_size+6), 367).

If the Check-in or the Check-out options are used, the Check-In/Check-Out flag must be set. This flag is set to '1' if the code contains the Check-in option and is reset to '0' if only the Check-out option is used. Examples:

| Check-in option | Check-out option | I/O flag |
|---|---|---|
| Not used | Not used | Not present |
| Not used | used | 0 |
| Used | Not used | 1 |
| Used | Used | 1 |

If used, the Check-in/Check-out fields are encoded on 4 bits (fixed length)

In this example use case, the device key (except for the master key) is derivated from the root key and the concatenation of the year and the Lock-id. This means that every year, the codes must be renewed. The proposal supports to use N−1 year codes for their whole lifespan. Example: if a short term code starts on December 20th for 20 days, the code remains valid in year+1 up to January 10th at midnight. In this example use case, the grace period is supported only for the following modes: Resident code; short term code; long term code; Flex code; revocation code.

The other modes may not require grace period: delivery code is planned on a specific week number (this does not overlap 2 years); maintenance code is scheduled for a specific day; passage mode is an autonomous mode (no code needed once configured), if the user wants to disable it he will have to generate a new code; and Master code is a time based One Time Password (OTP) valid only for a specific day/hour.

The optional overriding function may be useful to generate codes which will automatically revoke a previously generated user code (which may have a lower override level incorporated into the authorization conditions) having an overlapping authorized access period.

Figure 11A:
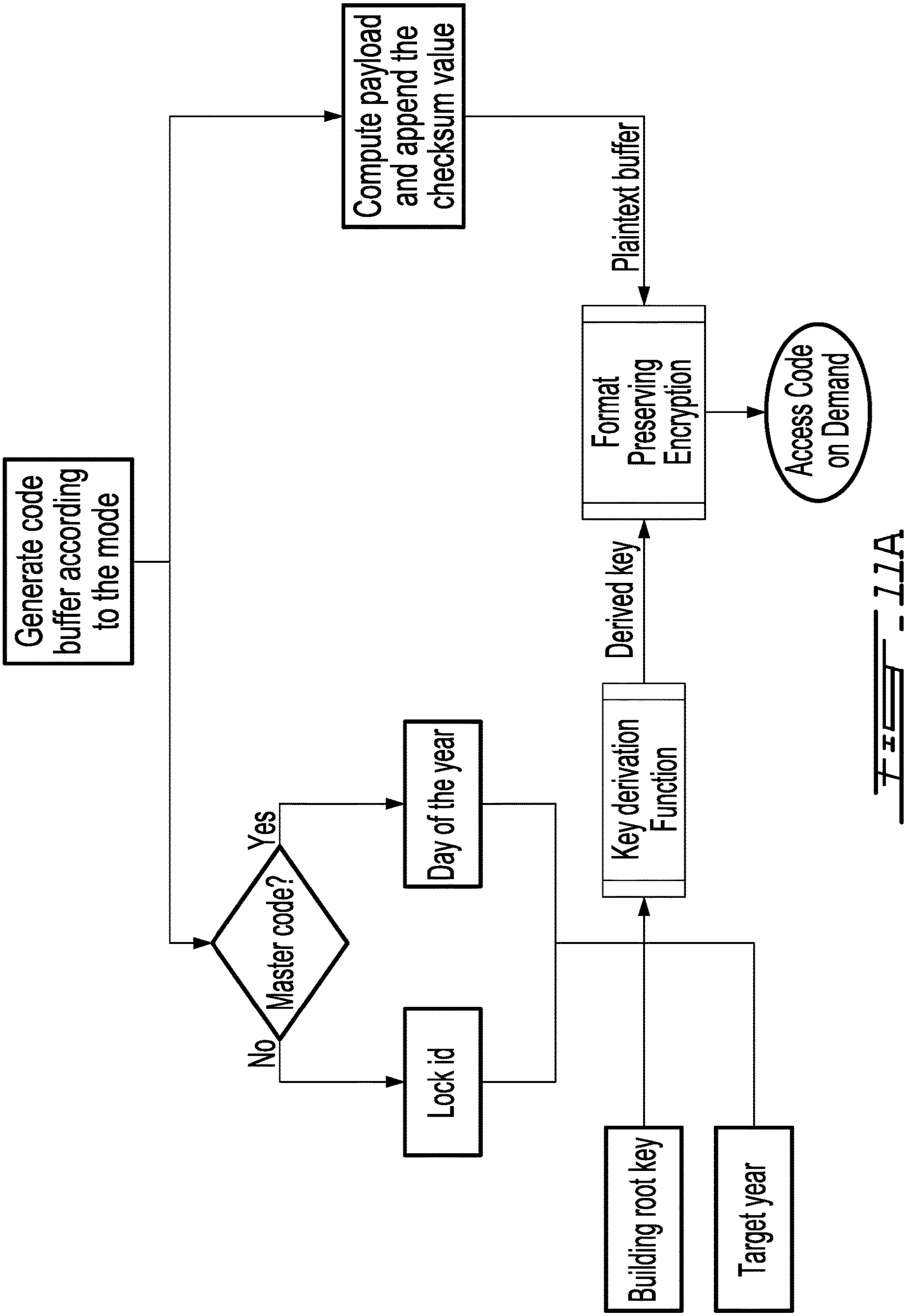
FIG. 11A is a flow chart of a code generation mode for an electronic lock in accordance with the example use case.
Figure 11B:
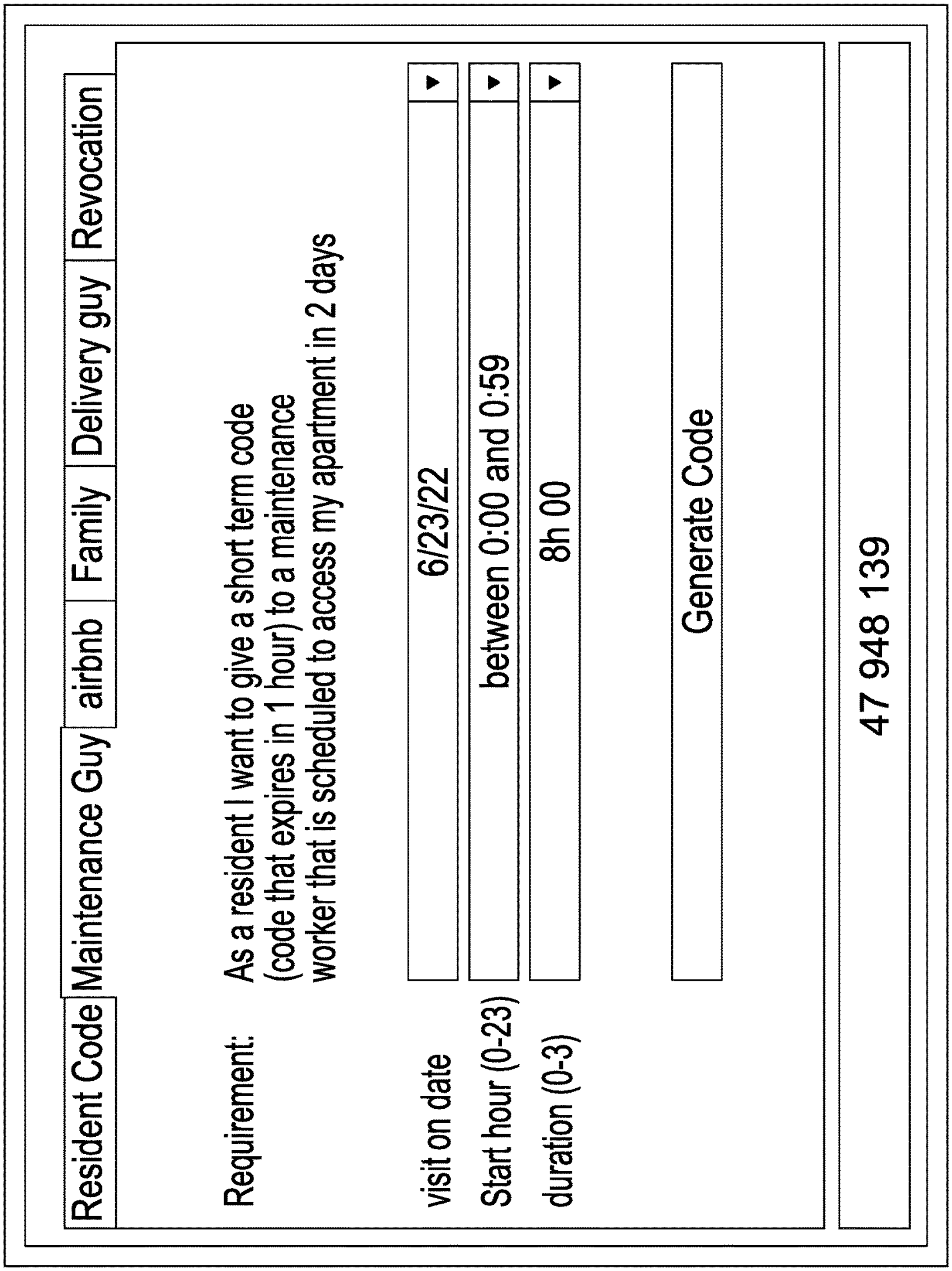
FIG. 11B is an example graphical user interface for the code generation mode in accordance with the example use case.

In this example use case, the code generation algorithm can run on a cloud server or on a mobile application, and be in accordance with the algorithm presented at FIG. 11A. With FIG. 11B presenting an example of a potential graphical user interface to facilitate the entering of the parameters associated to the authorization conditions. In this example, tabs can be used to reflect different modes. The selection of each tab can lead to a corresponding window which limits the prompts to values required in association to the corresponding mode. In this example, the generated user code is displayed at the bottom of the screen following entry of the parameters and clicking the "generate code" button.

Figure 12A:
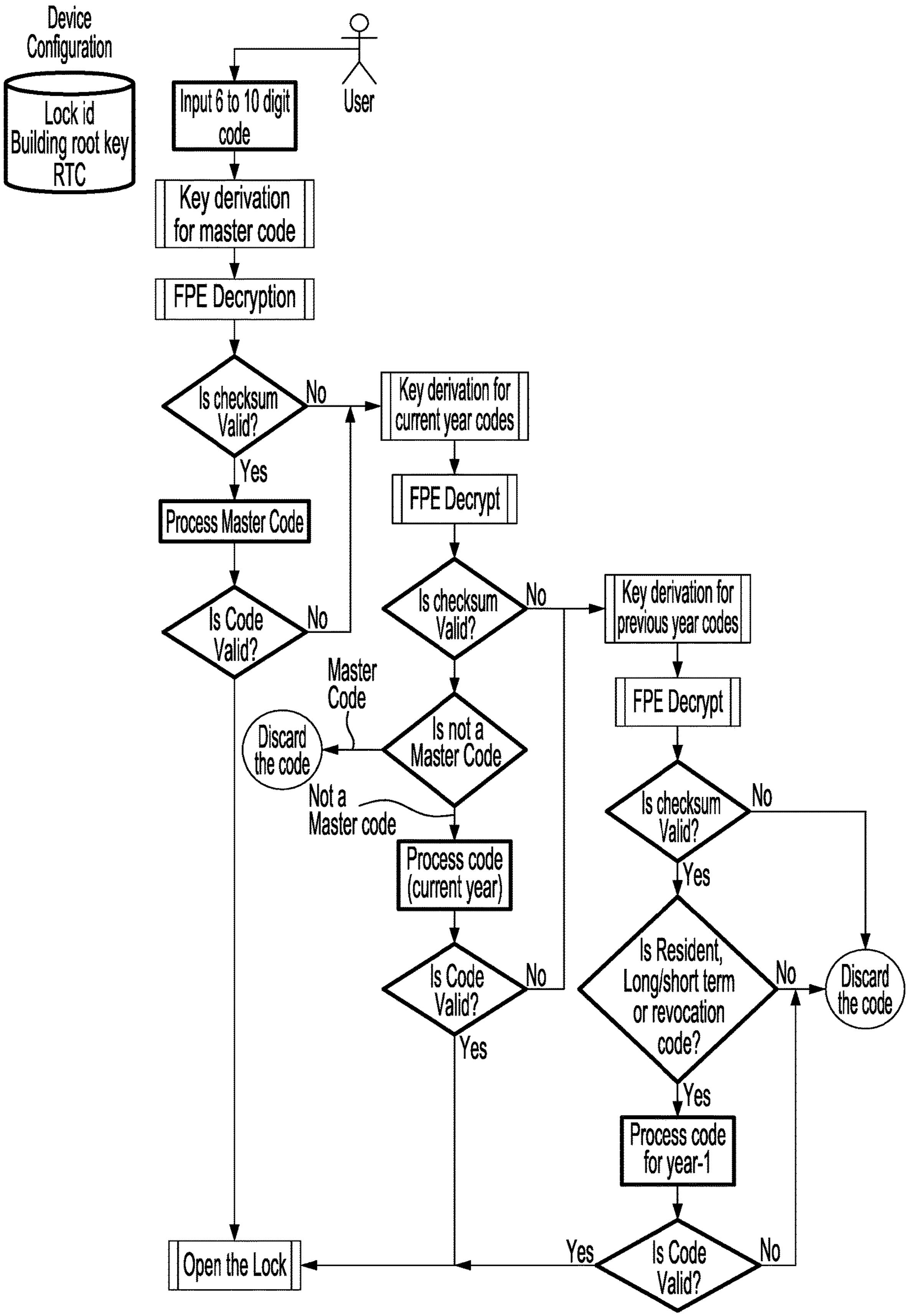
FIG. 12A is a flow chart of a user code input mode for an electronic lock in accordance with the example use case.

In this example use case, the code validation algorithm at the electronic lock can be as presented at FIG. 12A for instance, in which case the electronic lock first tries to decrypt master code message (key derivation with year and day in the year), check the Luhn. If the Luhn is correct, process the Master code, otherwise, try to decrypt user codes with key derivation based on year and lock-id. And check the checksum according to the mode. If the entered code is not accepted, the lock computer may activate a throttling mechanism to avoid brute force attack. An example throttling algorithm may be such as A simple implementation could be:

```
def on_code_verification_failed(failure_number: int = 0):
    """
    Implement throtling mecanism on wrong code
    The wait time is defined as 5 * 2^(failure_number − 1) with a maximum of 1 minute.
    Thus for the 1st failure the penalty is 5 seconds, for the 3rd it will be 40 s,
    for the 4th or more wrong code the penalty will be 1 min (per code)
    :param: failure_number: number of consecutive wrong codes, must be reset to 0 if a valid
code is used
    :return: None
    """
    if failure_number <= 0:
        failure_number = 1
    wait_time = min(5*2**(failure_number − 1), 60)
    time.sleep(wait_time)
```

Figure 12B:
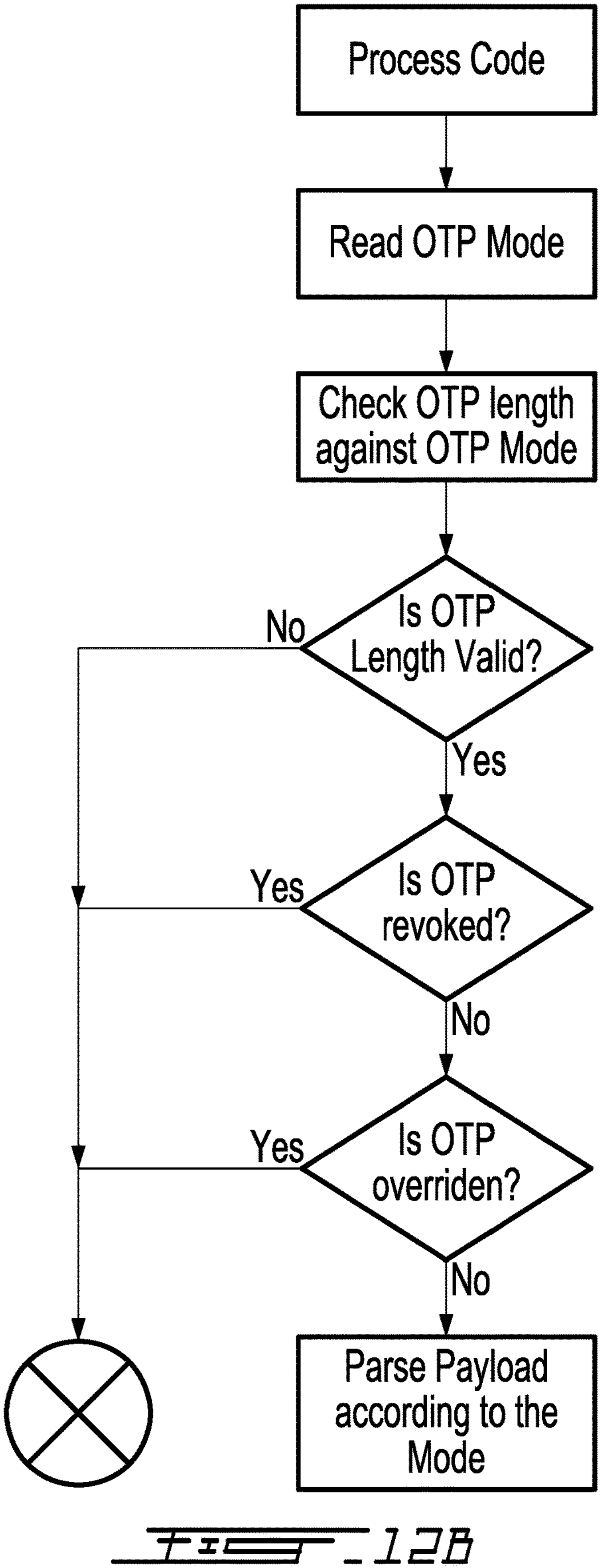
FIG. 12B is a flow chart of an optional one time password mode.

It will be understood that the code validation algorithm presented at FIG. 12A has several optional functionalities and is very specific to the use case, it is provided only for the purpose of example. FIG. 12B provides an example subroutine to address potential one time password mode.

In this example use case, code usage may be as follows: for a "resident door" lock, the user just enters his code and validates with hash sign. Example: Bob has resident code: 604 068. On his door lock, he will use "604068#". For "common access" locks, the "Resident Door" lock Number can be used to validate a code. In accordance with one example, the "Resident Door" Lock Number is inputted as a prefix to the code. Example: Bob is the Owner of Lock Number 25. His resident code is 604 068. On "Common Access" Locks he will input: "25#604068#". Such a use case can be introduced into the multihousing vertical and the vacation rental vertical for instance.

Figure 13:
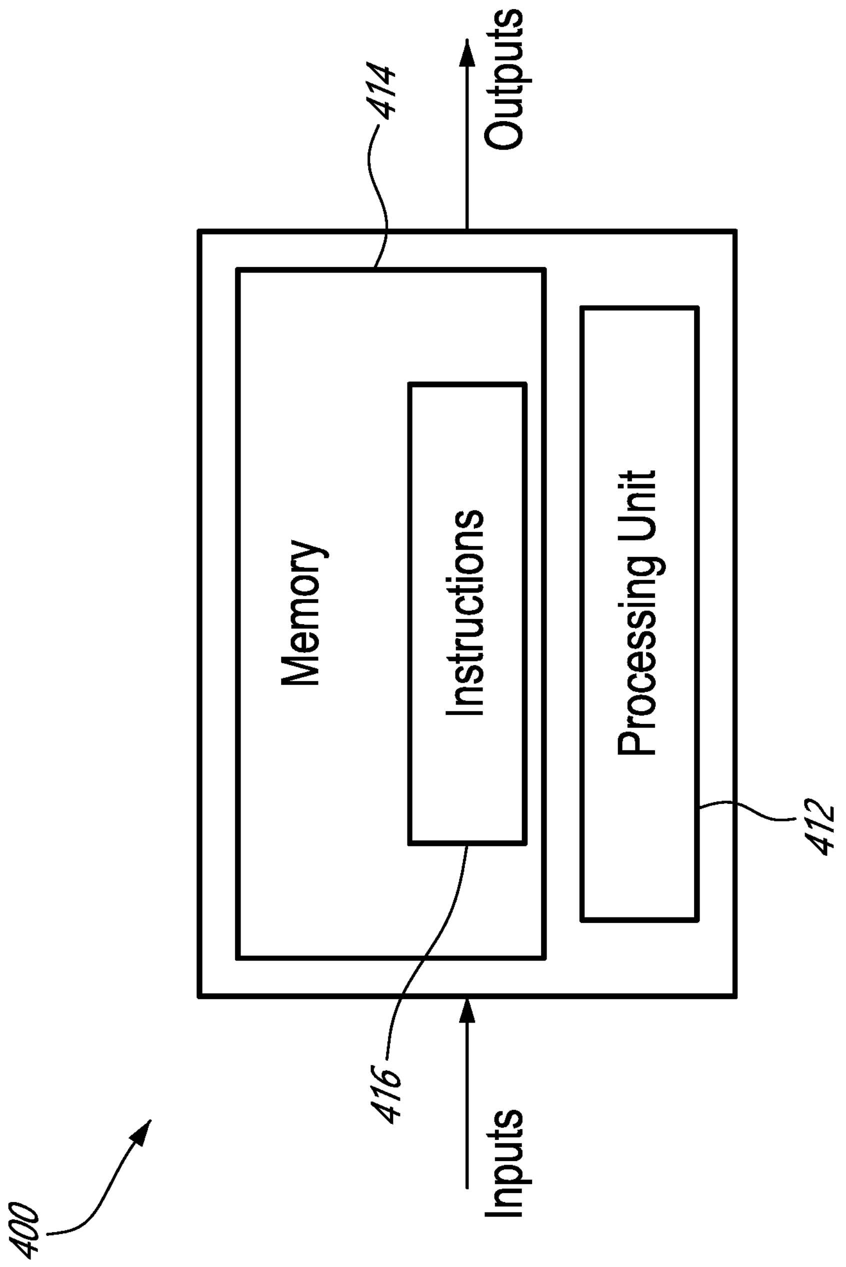
FIG. 13 is a schematic view of a computer.

Referring to FIG. 13, it will be understood that the expression "computer" 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), application specific integrated circuits (ASIC), a reconfigurable processor, and a programmable read-only memory (PROM, to name a few examples.

The memory system can include one or more memory of one or more types, such as a suitable combination computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples. A memory can be non-transitory. A memory can be non-volatile. A memory can be a register of a security processor, for instance. A memory can be secure or general purpose.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. Different elements of a computer, such as processor and/or memory, can be local, or in part or in whole remote and/or distributed and/or virtual.

The methods and systems of the present disclosure may be implemented in a high level procedural or object oriented programming or scripting language, or a combination thereof, to communicate with or assist in the operation of a computer system, for example the controller. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit of the computing device, to operate in a specific and predefined manner to perform the functions described herein, for example those described in the methods.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

As can be understood, the examples described above and illustrated are intended to be exemplary only. The scope is indicated by the appended claims.

What is claimed is:

1. An electronic lock comprising:

an actuator configured to allow or block an access to a physical space asset;

an input interface; and a lock computer configured to receive an input from the input interface and to operate the actuator, the lock computer having at least one memory and a processor, the at least one memory having stored thereon a decryption key and instructions_which, when executed by the processor, cause the lock computer to receive a user code having a string of between 6 and 15 characters from the input interface;

decrypt the user code into a plain text code via a format preserving decryption protocol using the decryption key, the plain text code including at least one command to perform at least one security-controlled task; and execute the at least one command, including performing the at least one security-controlled task;

wherein said decrypt the user code includes attempt to decrypt a master code using a master code format for the decryption key, and attempt to decrypt a non-master code using a non-master code format for the decryption key contingent upon failing the attempt to decrypt a master code.

2. The electronic lock of claim 1 wherein the input interface includes a keypad having a plurality of keys associated to corresponding ones of said characters, said receive a user code includes receive a user code from the keypad.

3. The electronic lock of claim 1 wherein at least one of the at least one command(s) includes an access control command, said performing the at least one security-controlled task including operating the actuator to grant access to the physical space asset.

4. The electronic lock of claim 1 wherein at least one of the at least one command(s) includes a behavior changing command and the at least one security controlled task includes at least one of preventing subsequent use of an other user code, and toggling into or out from a locking/unlocking schedule.

5. The electronic lock of claim 1 wherein the at least one command includes both at least one access control command and at least one behavior changing command.

6. The electronic lock of claim 1 wherein the format preserving decryption protocol is FF3-1.

7. The electronic lock of claim 1 wherein said perform the at least one security-controlled task is contingent upon determining that the plain text code is executable.

8. The electronic lock of claim 1 wherein the plain text code includes validity data including at least one of a checksum, Luhn, and a parity, further comprising performing a validity check against the validity data, wherein said perform the at least one security-controlled task is contingent upon determining that the validity data satisfies the validity check.

9. The electronic lock of claim 1 wherein said perform the at least one security-controlled task is contingent upon determining that the user code has not been previously received and/or decrypted and/or executed.

10. The electronic lock of claim 1 wherein the at least one command includes time period of access data, wherein said perform the at least one security-controlled task is contingent upon determining that a current time matches the time period of access data.

11. The electronic lock of claim 10 wherein the time period of access data includes a start time of a start day and an end time of an end day.

12. The electronic lock of claim 10 wherein the time period of access data defines a range of hours of a given day.

13. The electronic lock of claim 10 wherein the time period of access data includes a definition of one or more days, wherein time period of access data defining a range of hours between an arrival hour and a departure hour is provided at the at least one memory, and said perform the at least one security-controlled task is contingent upon determining that a current time matches the time period of access data, and wherein the user code has 6 numeric characters.

14. The electronic lock of claim 3 wherein said controlling the actuator includes allowing access to the physical space asset for a predetermined time period.

15. The electronic lock of claim 4 wherein said toggling into a locking/unlocking schedule includes controlling the actuator allow access to a physical space asset and deny access to the physical space asset in accordance with the locking/unlocking schedule, the locking/unlocking schedule being stored in the at least one memory.

16. The electronic lock of claim 1 wherein a character of the plain text code is a mode number defining a mode amongst a plurality of modes, further comprising interpreting other characters of the plain text code in accordance with the mode associated to the mode number.

17. The electronic lock of claim 1 wherein the lock computer further comprises a wireless transmission module forming part of the input interface and adapted to receive the user code.

18. The electronic lock of claim 1 wherein the master code format for the decryption key is derived with dynamic data.

19. The electronic lock of claim 1 wherein the non-master code format for the decryption key is derived with lock specific data.

20. The electronic lock of claim 2 wherein the user code has 6 or 8 characters associated to corresponding keys of the keypad, and the plain text code has 6 or 8 characters associated to corresponding keys of the keypad.

21. A computer-implemented process of operating an electronic lock, the process comprising:
- receiving, using an input interface, a user code having a string of between 6 and 15 characters;
- decrypting the user code into a plain text code via a format preserving decryption protocol using a decryption key, the plain text code including at least one command for performing at least one security-controlled task; and
- executing the at least one command, including performing the at least one security-controlled task;
- wherein said decrypting the user code includes attempting to decrypt a master code using a master code format for the decryption key, and attempting to decrypt a non-master code using a non-master code format for the decryption key contingent upon failing the attempt to decrypt a master code.

22. The process of claim 21 wherein the security-controlled task includes at least one of granting access to a physical space asset, preventing subsequent use of an other user code, and toggling into or out from a mode of operating the actuator based on a regular schedule.

23. The electronic lock of claim 21 wherein at least one of the at least one command(s) includes an access control command, said performing the at least one security-controlled task including operating an actuator to grant access to a physical space asset.

24. The electronic lock of claim 21 wherein at least one of the at least one command(s) includes a behavior changing command and the at least one security controlled task includes at least one of preventing subsequent use of an other user code, and toggling into or out from a locking/unlocking schedule.

25. The electronic lock of claim 21 wherein the at least one command includes both at least one access control command and at least one behavior changing command.

26. The process of claim 21 wherein the format preserving decryption protocol is FF3-1.

27. The process of claim 21 wherein said performing the at least one security-controlled task is contingent upon succeeding in said decrypting the user code and determining that the plain text code is executable.

28. The process of claim 21 wherein the plain text code includes validity data including at least one of a checksum, Luhn and a parity, said performing the at least one security-controlled task is contingent upon determining that the validity data satisfies a validity check.

29. The process of claim 21 wherein the user code includes a lockID, and said decrypting the user code includes determining that the lockID matches an identifier of the electronic lock.

30. The process of claim 21 wherein said performing the at least one security-controlled task is contingent upon determining that the user code has not been previously received and/or executed.

31. The process of claim 21 wherein the at least one command includes time period of access data, wherein said performing the at least one security-controlled task is contingent upon determining that a current time matches the time period of access data.

32. An electronic lock system comprising:
- a remote computer having an input interface, a processor, a non-transitory memory having a plurality of lockIDs associated to respective ones of a plurality of electronic locks, an encryption key, and instructions which, when executed by the processor of the remote computer, cause the remote computer to
  - define at least one command to perform at least one security-controlled task at a corresponding one of the lockIDs, for each one of the plurality of users, the at least one security-controlled task including at least one of granting access to a physical space asset, preventing subsequent use of an other user code, and changing a behavior of the electronic lock;
  - generate plain text code incorporating the at least one command, the plain text programming instructions having a format of a string of 6 to 15 characters, encrypt, via format preserving encryption, the plain text programming instructions into a user code using the encryption key, the user code having a format of a string of 6 to 15 characters, and output the user code for communication to the corresponding user; and a plurality of electronic lock devices each having a respective actuator configured to allow or block an access to a physical space asset, a lock computer configured to operate the actuator and having an input interface including a keypad, a processor, at least one memory having a respective one of the lockIDs, a decryption key corresponding to the encryption key, and instructions which, when executed by the processor of the lock computer, cause the lock computer to receive the user code from the input interface, decrypt, using format preserving decryption, the user code into the plain text code, and perform the at least one security-controlled task based on the plain text code;

wherein said decrypt the user code includes attempt to decrypt a master code using a master code format for the decryption key, and attempt to decrypt a non-master code using a non-master code format for the decryption key contingent upon failing the attempt to decrypt a master code.

33. The electronic lock system of claim 32 wherein outputting the user code for communication to a corresponding user includes outputting the user code over a telecommunications network to an electronic device of the user, and displaying the user code on a display screen of the electronic device.

* * * * *